(12) United States Patent
Cwiertny et al.

(10) Patent No.: US 10,807,890 B2
(45) Date of Patent: Oct. 20, 2020

(54) WATER TREATMENT SYSTEMS AND METHODS

(71) Applicant: UNIVERSITY OF IOWA RESEARCH FOUNDATION, Iowa City, IA (US)

(72) Inventors: David M. Cwiertny, Iowa City, IA (US); Jason P. Haase, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 513 days.

(21) Appl. No.: 15/056,676

(22) Filed: Feb. 29, 2016

(65) Prior Publication Data
US 2016/0251244 A1 Sep. 1, 2016

Related U.S. Application Data

(60) Provisional application No. 62/126,062, filed on Feb. 27, 2015.

(51) Int. Cl.
*C02F 1/72* (2006.01)
*C02F 1/78* (2006.01)

(52) U.S. Cl.
CPC ............. *C02F 1/78* (2013.01); *C02F 1/725* (2013.01); *C02F 2305/023* (2013.01); *C02F 2305/08* (2013.01)

(58) Field of Classification Search
CPC .. C02F 1/44; C02F 1/441; C02F 1/442; C02F 1/444; C02F 1/725; C02F 1/78; C02F 2305/023; C02F 2305/08; B01D 69/10; B01D 69/105; B01D 69/12; B01D 71/02; B01D 71/021
See application file for complete search history.

(56) References Cited

U.S. PATENT DOCUMENTS

2011/0220574 A1* 9/2011 Bakajin ............... B01D 71/021
210/650

OTHER PUBLICATIONS

Yang et al., "Functionalization of Multiwalled Carbon Nanotubes by Mild Aqueous Sonication", J. Phys. Chem. B (2005), 109, 7788-7794. (Year: 2005).*
Alvarez, et al., "A comparison between catalytic ozonation and activated carbon adsorption/ozone-regeneration processes for wastewater treatment", Applied Catalysis B: Environmental 92 (3-4), 393-400 (2009).
Alvarez, et al., "Kinetics of Ozone Decomposition by Granular Activated Carbon", Ind Eng Chem Res 47(8), 2545-2553 (2008).
Alvarez, et al., "The influence of various factors on aqueous ozone decomposition by granular activated carbons and the development of a mechanistic approach", Carbon 44(14), 3102-3112 (2006).
Bader, et al., "Determination of ozone in water by the indigo method", Water Research 15(4), 449-456 (1981).

(Continued)

*Primary Examiner* — Lucas A Stelling
(74) *Attorney, Agent, or Firm* — Viksnins Harris Padys Malen LLP

(57) ABSTRACT

The invention provides a water purification system or a water treatment system comprising carbon nanotubes, as well as methods for purifying or treating water using the systems of the invention.

2 Claims, 26 Drawing Sheets

(56) References Cited

OTHER PUBLICATIONS

Bader, "Rate constants of reactions of ozone with organic and inorganic compounds in water—II: Dissociating organic compounds", Water Research 17 (2), 185-194 (1983).
Baltrusaitis, et al., "Reactions of sulfur dioxide on calcium carbonate single crystal and particle surfaces at the adsorbed water carbonate interface", Phys Chem Chem Phys 9, 3011-3024 (2007).
Banerjee, et al., "Rational chemical strategies for carbon nanotube functionalization", Chemistry 9(9), 1898-1908 (2003).
Banerjee, et al., "Rational Sidewall Functionalization and Purification of Single-Walled Carbon Nanotubes by Solution-Phase Ozonolysis", J Phys Chem B 106, 12144-12151 (2002).
Beltran, et al., "Diclofenac removal from water with ozone and activated carbon", J Haz Mater 163, 768-776 (2009).
Beltran, et al., "Kinetics of Catalytic Ozonation of Oxalic Acid in Water with Activated Carbon", Ind Eng Chem Res 41 (25), 6510-6517 (2002).
Brady-Estevez, et al., "A single-walled-carbon-nanotube filter for removal of viral and bacterial pathogens", Small 4(4), 481-484 (2008).
Brady-Estevez, et al., "SWNT-MWNT Hybrid Filter Attains High Viral Removal and Bacterial Inactivation", Langmuir 26(24), 19153-19158 (2010).
Buffle, et al., "Measurement of the initial phase of ozone decomposition in water and wastewater by means of a continuous quench-flow system: Application to disinfection and pharmaceutical oxidation", Water Research 40(9), 1884-1894 (2006).
Buffle, et al., "Ozonation and Advanced Oxidation of Wastewater: Effect of O3 Dose, pH, DOM and HO•-Scavengers on Ozone Decomposition and HO•Generation", Ozone—Sci Eng, Journal of International Ozone Associate 28 (4), 247-259 (2006).
Burda, et al., "Chemistry and properties of nanocrystals of different shapes", Chem Rev 105, 1025-1102 (2005).
Byun, et al., "Mn oxide coated catalytic membranes for a hybrid ozonation-membrane filtration: comparison of Ti, Fe and Mn oxide coated membranes for water quality", Water Res 45 (1), 163-170 (2011).
Elovitz, et al., "Hydroxyl Radical/Ozone Ratios During Ozonation Processes. I. The Rct Concept", Ozone Sci Eng, Journal of International Ozone Assoc. 21(3), 239-260 (1999).
Fan, et al., "The role of multiwalled carbon nanotubes (MWCNTs) in the catalytic ozonation of atrazine", Chem Eng J 241, 66-76 (2014).
Faria, et al., "Activated Carbon Catalytic Ozonation of Oxamic and Oxalic Acids", Appl Catal B-Environ 79, 237-243 (2008).
Faria, et al., "Mineralisation of coloured aqueous solutions by ozonation in the presence of activated carbon", Water Res 39, 1461-1470 (2005).
Fogden, et al., "Purification of single walled carbon nanotubes: The problem with oxidation debris", Chemical Physics Letters 460 (1-3), 162-167 (2008).
Gao, et al., "Electrochemical Carbon Nanotube Filter Oxidative Performance as a Function of Surface Chemistry", Environ Sci Technol 45(22), 9726-9734 (2011).
Goncalves, et al., "Influence of the surface chemistry of multi-walled carbon nanotubes on their activity as ozonation catalysts", Carbon 48, 4369-4381 (2010).
Haase, "Development and Scale-Up of a Hybrid Carbon Nanotube Filter as a Reactive Substrate in Ozone-Based Advanced Oxidation", Thesis, for Master of Science degree in Civil and Environmental Engineering in Graduate College of the University of Iowa, 103 pages (May 2015).
Haase, et al., "Development and scale-up of a hybrid CNT filter as a reactive substrate in O3-based advanced oxidation process", University of Iowa, EES Seminar, 71 pages, Apr. 3, 2015.
Hasse, et al., "Development and scale-up of a hybrid CNT filter as a reactive substrate in O3-based advanced oxidation processes", ACS National Meeting, 21 pages, Aug. 10, 2014.

Hernadi, et al., "Reactivity of different kinds of carbon during oxidative purification of catalytically prepared carbon nanotubes,", 14th International symposium on the Reactivity of Solids, Aug. 27, 2000-Aug. 31, 2000, Budapest, Hungary, 203-209 (2001).
Hou, et al., "Purification of carbon nanotubes", Carbon 46, 2003-2025 (2008).
Jans, et al., "Activated Carbon and Carbon Black Catalyzed Transformation of Aqueous Ozone into OH-Radicals", Ozone: Science & Engineering, Journal of the Ozone Association vol. 20 (1), 67-90 (1998).
Karnik, et al., "Fabrication of Catalytic Membranes for the Treatment of Drinking Water Using Combined Ozonation and Ultrafiltration", Environ Sci Technol 39, 7656-7661 (2005).
Kasprzyk-Hordern, et al., "Catalytic ozonation and methods of enhancing molecular ozone reactions in water treatment", Applied Catalysis B: Environmental 46, 639-669 (2003).
Liu, et al. "Effect of ozonation pretreatment on the surface properties and catalytic activity of multi-walled carbon nanotube", App Catal B-Environ 92(3-4), 301-306 (2009).
Liu, et al. "Influence of different heat treatments on the surface properties and catalytic performance of carbon nanotube in ozonation", Applied Catalysis B: Environmental 101, 74-80 (2010).
Mauter, et al., "Environmental Applications of Carbon-Based Nanomaterials", Environ Sci Technol 42(16), 5853-5859 (2008).
Morales-Lara, et al., "Functionalization of Multiwall Carbon Nanotubes by Ozone at Basic pH. Comparison with Oxygen Plasma and Ozone in Gas Phase", J Phys Chem C 117(22), 11647-11655 (2013).
Naeimi, et al., "Efficient and facile one pot carboxylation of multiwalled carbon nanotubes by using oxidation with ozone under mild conditions", Applied Surface Science 256(3), 631-635 (2009).
Neta, et al., "Pulse Radiolysis Studies. XIII. Rate Constants for the Reaction of Hydroxyl Radicals with Aromatic Compounds in Aqueous Solutions", Advances in Chemistry 81, Chapter 15, 222-230 (1968).
Oulton, "Development of Nanomaterial-Enabled Advanced Oxidation Techniques for Treatment of Organic Micropollutants", Thesis, for Doctor of Philosophy degree in Civil Environmental Engineering in the Graduate College of The University of Iowa, 231 pages (Aug. 2013).
Oulton, et al., "Hydroxyl radical formation during ozonation of multiwalled carbon nanotubes: performance optimization and demonstration of a reactive CNT filter", Environ Sci Technol 49(6), 3687-3697 (2015).
Peng, et al., "Room temperature functionalization of carbon nanotubes using an ozone/water vapor mixture", Carbon 49(1), 70-76 (2011).
Pines, et al., "Solid Phase Catalytic Ozonation Process for the Destruction of a Model Pollutant", Ozone: Science & Engineering 25 (1), 25-39 (2003).
Rahaman, et al., "Electrochemical Carbon-Nanotube Filter Performance toward Virus Removal and Inactivation in the Presence of Natural Organic Matter", Environ Sci Technol 46(3), 1556-1564 (2012).
Rocha, et al., "Catalytic activity and stability of multiwalled carbon nanotubes in catalytic wet air oxidation of oxalic acid: The role of the basic nature induced by the surface chemistry", Appl Catal B-Environ 104, 330-336 (2011).
Rosal, et al., "Kinetics and Mechanism of Catalytic Ozonation of Aqueous Pollutants on Metal Oxide Catalysts", Ozone: Science & Engineering 33, 434-440 (2011).
Rosca, et al., "Oxidation of multiwalled carbon nanotubes by nitric acid", Carbon 43(15), 3124-3131 (2005).
Rosenbeldt, et al., "Comparison of the Efficiency of *OH Radical Formation During Ozonation and the Advanced oxidation Processes O3/H2o2 and UV/H2O2", Water Res 40(20), 3695-3704 (2006).
Sanchez-Polo, et al., "Combination of Ozone with Activated Carbon as an Alternative to Conventional Advanced oxidation Processes", Ozone: Science & Engineering, Journal of International Ozone Assoc 28 (4), 237-245 (2006).
Sanchez-Polo, et al., "Effect of the ozone-carbon reaction on the catalytic activity of activated carbon during the degradation of 1,3,6-naphthalenetrisulphonic acid with ozone", Carbon 41(2), 303-307 (2003).

(56) References Cited

OTHER PUBLICATIONS

Sanchez-Polo, et al., "Efficiency of activated carbon to transform ozone into *OH radicals: influence of operational parameters", Wat Res 39, 3189-3198 (2005).

Sanchez-Polo, et al., "Metal-doped carbon aerogels as catalysts during ozonation processes in aqueous solutions", Wat Res 40, 3375-3384 (2006).

Sanchez-Polo, et al., "Removal of pharmaceutical compounds, nitroimidazoles, from waters by using the ozone/carbon system", Wat Res 42, 4163-4171 (2008).

Simmons, et al., "Effect of ozone oxidation on single-walled carbon nanotubes", J Phys Chem B 110(14), 7113-7118 (2006).

Smith, et al., "Influence of surface oxides on the colloidal stability of multi-walled carbon nanotubes: a structure-property relationship", Langmuir 25, 9767-9776 (2009).

Staehelin, et al., "Decomposition of ozone in water in the presence of organic solutes acting as promoters and inhibitors of radical chain reactions", Environ Sci Technol 19(12), 1206-1213 (1985).

Tasis, et al., "Chemistry of carbon nanotubes", Chemical Reviews 106, 1105-1136 (2006).

Valdez, et al., "Effect of Ozone Treatment on Surface Properties of Activated Carbon", Langmuir 18(6), 2111-2116 (2002).

Vecitis, et al., "Sonolytic decomposition of aqueous bioxalate in the presence of ozone", J Phys Chem A 144, 4968-4980 (2010).

Vennerberg, et al., "Oxidation behavior of multiwalled carbon nanotubes fluidized with ozone", ACS Appl Mater Interf 6, 1835-1842 (2014).

Wepasnik, et al., "Surface and structural characerization of multi-walled carbon nanotubes following different oxidative treatments", Carbon 49, 24-36 (2011).

Yao, et al., "Rate constants for direct reactions of ozone with several drinking water contaminants", Wat Res 25, 761-773 (1991).

Zhang, et al., "Hydrothermal synthesis, structure, and optical properties of two nanosized Ln26 @CO3 (Ln=Dy and Tb) cluster-based lanthanide-transition-metal-organic frameworks (Ln MOFs)", Chemistry 21 (8), 3234-3241 (2015).

* cited by examiner

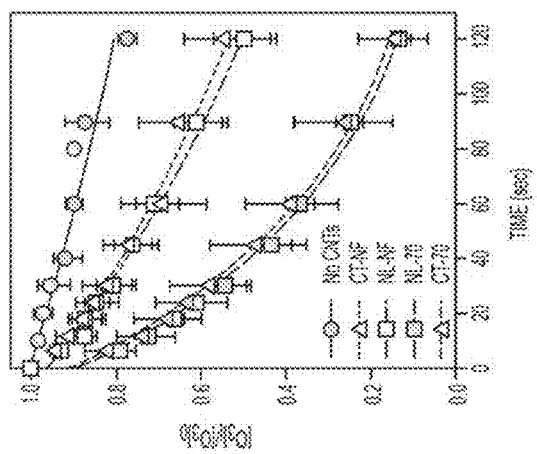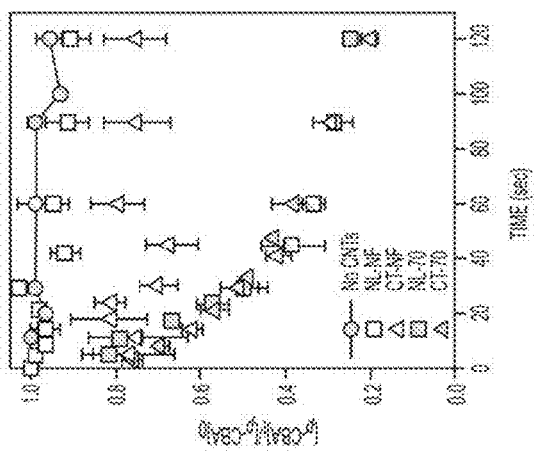

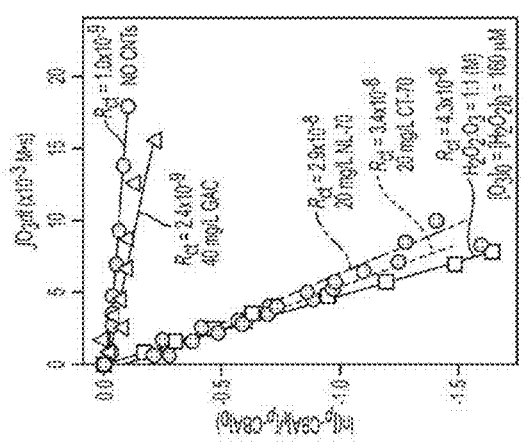
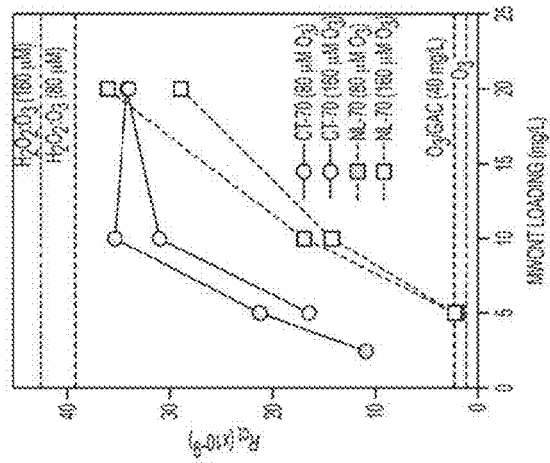
FIG. 7A
FIG. 7B

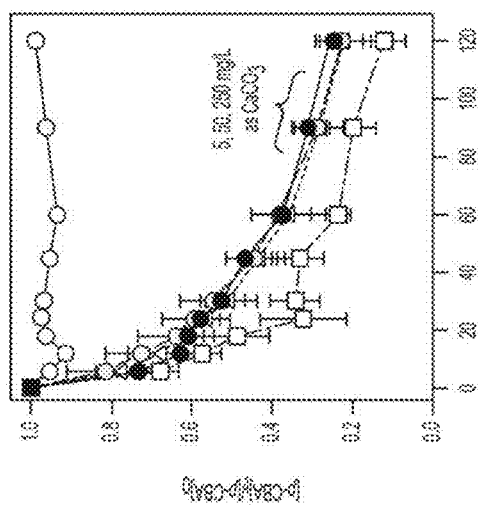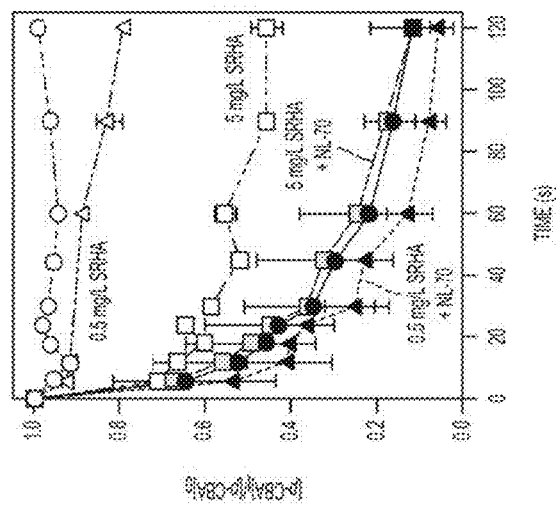
FIG. 8A
FIG. 8B

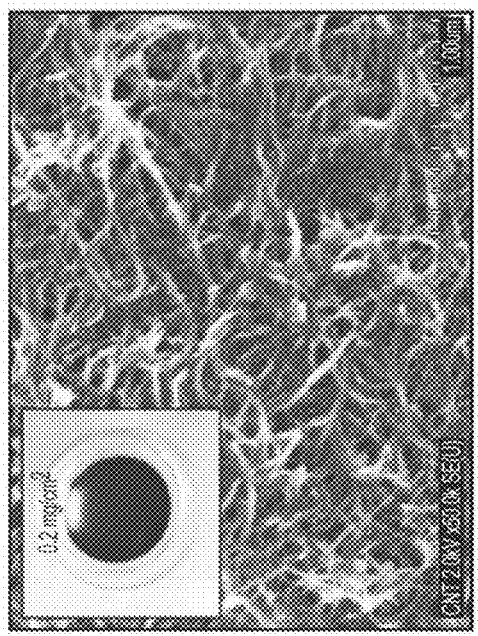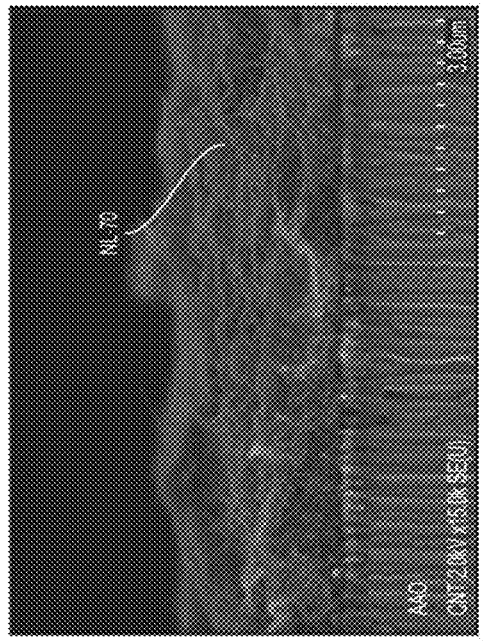
FIG. 9A
FIG. 9B

WATER TREATMENT SYSTEMS AND METHODS

PRIORITY OF INVENTION

This application claims priority to U.S. Provisional Application No. 62/126,062, filed 27 Feb. 2015. The entire content of this United States Provisional application is hereby incorporated herein by reference.

BACKGROUND

In arid regions of the U.S., the reliable supply of water for human use and consumption represents a monumental challenge. California, for example, relies on water from the San Joaquin River Delta, which is at risk of saltwater encroachment, declining fish habitats, and damage from aging and under-designed levees. Low precipitation has left groundwater basins overdrawn, and the Colorado River is in the midst of a crippling 8 year drought. Climate change represents an emerging threat that could reduce the Sierra snowpack by 40% by 2050. Meanwhile, California's population continues to grow, anticipated to increase from 36.7 million in 2005 to 59.5 million by 2050. Water demand will undoubtedly rise concomitantly, requiring an increased reliance on alternative sources. This includes the reclamation and reuse of municipal wastewater, with application to ecosystem restoration, irrigation, and aquifer recharge for indirect potable reuse. Currently, 500,000 acre-feet of treated municipal wastewater are reused in California annually, and projections suggest another 1.4-1.7 million acre-feet could be utilized by 2030.

While conventional treatment is effective in reducing many risks, a new generation of organic micropollutants in wastewater effluent has increased scrutiny of water recycling. These include hormones, pharmaceuticals, and endocrine-disrupting compounds, many of which can persist or only be partly degraded during traditional treatment. These contaminants of emerging concern have stimulated interest in the use of advanced oxidation processes (AOPs) in wastewater treatment. AOPs such as ultraviolet light (UV) in tandem with peroxide ($H_2O_2$), UV with ozone ($O_3$), and $O_3$ with $H_2O_2$ generate .OH, the most powerful oxidant in water. Unlike highly selective $O_3$, .OH degrades most organics at near diffusion-limited rates.

AOPs will be an integral component of future water recycling programs. The most prominent water reclamation and reuse system, the Groundwater Replenishment System operated by Orange County Sanitation District (OCSD) in California, uses UV/$H_2O_2$ as a final polishing step prior to aquifer storage and recovery. Increased reliance on membrane technologies will also motivate AOP applications, which are useful for the destruction of hazardous organic matter in retentates. In particular, AOPs will be an attractive option to landlocked states without the luxury of discharging concentrates into ocean waters.

Given that application of AOPs will most certainly grow in the future, efforts must be made to further optimize their performance and minimize negative consequences of their use. Concerns over the monetary and energy costs of advanced treatment mandate cost-effective routes for .OH production. Also necessary is management of hazardous oxidation byproducts. These include bromate ($BrO_3^-$), which is regulated in drinking water, and small organic breakdown products that can stimulate problematic biological growth post-treatment. Further, due to the highly reactive and transient nature of .OH, treatment efficiency can be highly variable depending on water quality.

An innovative approach that may one day help to overcome these limitations in AOP performance is catalytic ozonation. In these systems, a catalyst, typically a metal oxide or activated carbon, promotes $O_3$ decomposition into .OH resulting in greater rates of pollutant decay and increased mineralization (i.e., organic conversion to $CO_2$). Notably, pollutant transformation is not limited to the catalyst surface, as solution phase probes and electron paramagnetic resonance have provided evidence for .OH in bulk solution.

For metal oxides, .OH production is most often attributed to surface hydroxyl groups. Trends in catalyst activity as a function of pH indicate that neutral surface hydroxyl groups (i.e., —OH) rather than the deprotonated or protonated forms (i.e., —O$^-$ and —OH$_2^+$) are most active. It is proposed that the superior ability of neutral groups arises from the need for not only an electron-rich center for ozone attack (i.e., the lone electron pairs on the oxygen atom) but also an abstractable hydrogen for .OH production. Mechanistic understanding is more limited for granular and powdered activated carbon (GAC and PAC). Recent studies have suggested that activated carbons high in surface area and exhibiting basic surface functionalities are best at promoting $O_3$ decomposition. A particularly reactive material was a GAC sample pretreated with urea, and surface analysis showed a distinct loss of pyrrole surface functionalities after ozonation, implicating their involvement in .OH production.

Activated carbon represents a more practical catalyst than metal oxides because it is already applied in large-scale water and wastewater treatment. It is also a more cost-effective agent for .OH production from ozone relative to energy-intensive $H_2O_2$ and UV, and DOC removal from surface water in $O_3$/GAC systems is comparable to these traditional ozone-based AOPs. An added benefit is that use of GAC allows for concurrent sorption of target compounds and partial oxidation products, which also improves treatment efficiency. GAC also can be effective for removing $BrO_3^-$, and thus could provide byproduct control. Nevertheless, despite these practical advantages, catalytic ozonation remains largely a novelty limited to laboratory demonstrations, not yet gaining practical acceptance. This is due largely to lingering questions regarding the molecular-level processes governing .OH production, and concerns over the long-term stability of GAC during ozonation.

SUMMARY

It has been determined that carbon nanotubes (CNTs) are ideally suited for use in advanced water and wastewater treatment. CNTs are typically one-dimensional (1-D) carbon nanostructures consisting of one or more graphene sheets rolled into a cylinder several microns in length with a nanoscale diameter. Similar to their bulk counterparts, CNTs have recently shown promise as highly stable and selective gas phase oxidation catalysts.

Although CNTs share some attributes with bulk carbon, they also exhibit unique differences owing to their nanoscale dimensions. Many of these features, including high external surface area, tremendous mechanical strength and thermal stability, make them superior for engineered application relative to activated carbon. Thus the aforementioned benefits associated with activated carbon during ozonation will likely be accentuated in the presence of CNTs.

CNTs make ideal catalytic materials because their physical, chemical and electrical properties are tunable through manipulation of their bulk and surface composition, which may allow their catalytic activity toward $O_3$ to be optimized. The conductivity of CNTs, for example, varies in response to the number of graphene sheets incorporated into their structure; single-walled carbon nanotubes (SWCNTs) consisting of one rolled graphene sheet can exhibit metallic or semi-metallic properties, whereas dual-walled (DWCNTs; two graphene sheets) and multi-walled (MWCNTs; >two graphene sheets) CNTs behave as semiconducting materials similar to graphite. Accordingly, SWCNTs exhibit redox reactivity, which should improve their catalytic function because oxidizable centers promote .OH yields during ozonation. Surface functionalization represents another route by which CNT activity can be manipulated. This is particularly advantageous for CNT application as ozonation catalysts because the existing body of work in this area provides a starting point for the rational synthesis of functionalized CNT with optimal .OH yields. More recently, considerable progress has been made in the ability to decorate CNT surfaces with a range of nanostructures of well-defined composition, size, crystallinity, and morphology. These hybrid nanomaterials display unique properties unlike the building blocks from which they are constructed, and their development has led to significant advances in the fields of sensing, optics, electronics, media storage and catalysis. However, outside of sensor development, their potential as tools for pollution control is largely unrecognized.

A final factor warranting a study of functionalized and hybridized CNTs as ozonation catalysts is the recent thrust to incorporate carbon nanotubes as coatings in filtration membranes (FIG. 1). Such filters exploit the mechanical strength of polymer-CNT composites as well as the antimicrobial capacity of CNTs to improve membrane performance. Tybrid filters can be used in contact with an ozonated feed solution to simultaneously disinfect, chemically oxidize potentially harmful organics, and minimize or sequester deleterious oxidation byproducts.

In one embodiment the invention provides a water purification system or water treatment system comprising carbon nanotubes (CNTs).

The invention also provides a filtration method described herein, a purification method described herein, a water filtration system as described herein, and a water purification system as described herein.

BRIEF DESCRIPTION OF THE FIGURES

FIG. 2($b$). a TEM image of Pt/MWCNTs synthesized via $K_2PtCl_6$ reduction by ethylene glycol.

FIG. 4($a$). data from a functionalized MWCNT reaction with $O_3$ and measured $k_D$ values; FIG. 4($b$). shows p-CBA decay in the presence and absence of MWCNT-OH; $O_3$ decay in MWCNT system is shown; pH 7.0 (5 mM phosphate), 15 mg/L CNT, $[O_3]_0$=6 mg/L, $[p\text{-}CBA]_0$=10 μM. p-CBA systems contained 1 mM t-butanol.

FIGS. 6$a$-$b$. FIG. 6($a$) Normalized concentration data for ozone and FIG. 6($b$) p-CBA as a function of time in CT-NF, NL-NF, CT-70 and NL-70 suspensions. Also provided are $O_3$ and p-CBA data from a system free of MWCNTs. Data represent averages (and standard deviation) from at least triplicate experiments. Exponential model fits to describe $O_3$ decay are shown in panel (a) from regression analysis. Experimental conditions: MWCNT=20 mg/L; $[O_3]$=160 μM; [t-butanol]=320 μM; [p-CBA]=2 μM; pH 7 (5 mM phosphate buffer).

FIG. 7($a$) $R_{CT}$ plots for CT-70 and NL-70 suspensions (20 mg/L), as well as for $O_3$ alone, $O_3$/GAC (40 mg/L), and equimolar (1:1) $O_3/H_2O_2$. FIG. 7($b$) $R_{CT}$ values for CT-70 and NL-70 as a function of suspension concentration. Dashed lines indicate $R_{CT}$ values for an $O_3$ system without CNTs (80 and 160 μM), $O_3$/GAC, and equimolar $O_3/H_2O_2$. FIG. 7($c$) Values of $[\Delta p\text{-}CBA]/[\Delta O_3]$ as a function of time in CT-70 and NL-70 suspensions, as well equimolar $O_3/H_2O_2$. Dashed lines indicate the average ratio in each system [$(1.25\pm0.08)\times10^{-2}$, $(9.8\pm0.5)\times10^{-3}$, and $(1.01\pm0.14)\times10^{-2}$ for $O_3/H_2O_2$, NL-70 and CT-70, respectively]. FIG. 7($d$) $R_{CT}$ values as a function of surface oxygen concentration for both CT and NL MWCNTs. Due to limited reactivity in as-received MWCNT systems, these $R_{CT}$ values are estimates for the purpose of comparison only. The line is the best fit linear regression analysis for the relationship between $R_{CT}$ and surface oxygen concentration for NL MWCNTs. Unless otherwise noted, experimental conditions: MWCNT=20 mg/L; $[O_3]$=160 μM; [t-butanol]=320 μM; [p-CBA]=2 μM; pH 7 (5 mM phosphate buffer).

FIG. 9($a$) Top down and FIG. 9($b$) cross sectional SEM images of a hybrid CNT-AAO filter. The inset in (a) is a top down picture of the coated AAO disk (47 mm in diameter) for a loading of 0.2 mg/cm² of NL-70. FIG. 9($c$) Single pass removal of p-CBA as a function of inlet $O_3$ concentration using a bench top dead-end filtration system equipped with the 0.2 mg/cm² CNT-AAO filter. The inset to (c) shows how single pass p-CBA removal changed as a function of CNT loading. Influent solution conditions for all filter trials: $[O_3]$=160 μM; [t-butanol]=320 M; [p-CBA]=2 μM; pH 7 (5 mM phosphate buffer).

FIG. 13(a) Results from sedimentation studies with CT and NL suspensions with various degrees of MWCNT surface oxidation. Suspensions (20 mg/L) were prepared in 5 mM phosphate buffer. A portion of suspension was then transferred to a 1-cm quartz cuvette and rates of settling were measured by the change in light transmittance (λ of 300 nm) as a function of time using a UV/visible spectrophotometer. Generally, suspension stability increased with the degree of MWCNT surface oxidation. This outcome is shown on the right in photographs of 1 g/L stock suspensions of CT-NF (FIG. 13(b)) and CT-70 (FIG. 13(c)) prepared in DI water. Images were taken 1 h after the stock suspensions were vigorously shaken by hand.

Figure 10:
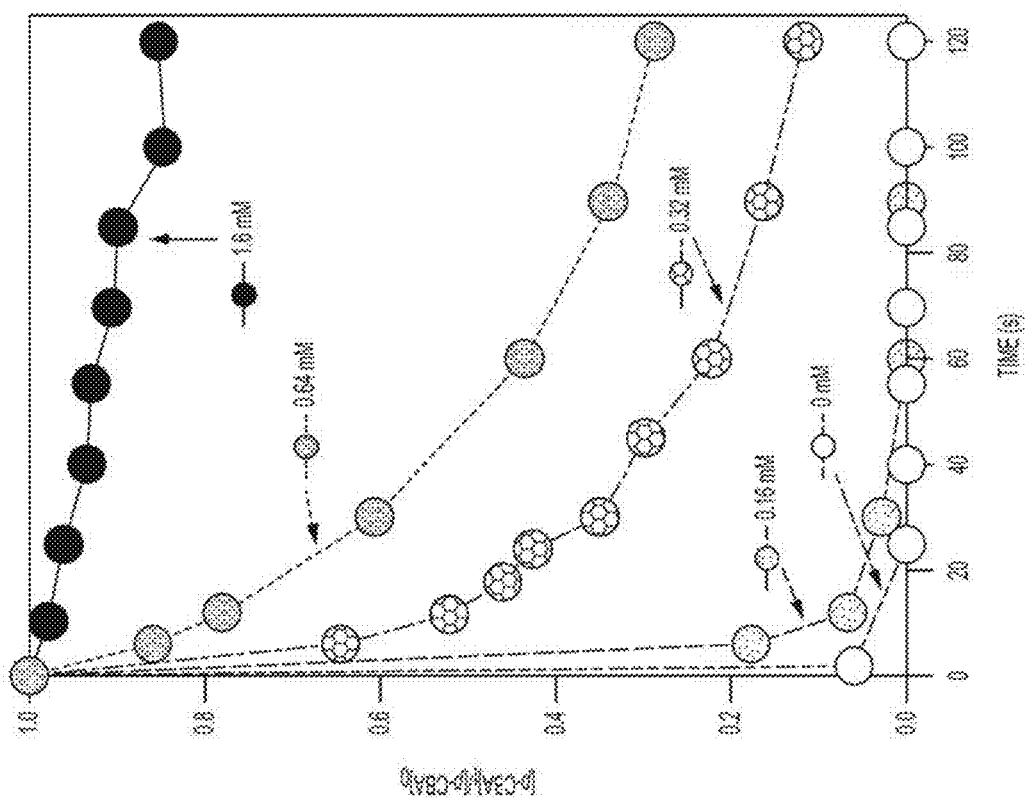
FIG. 10. Normalized p-CBA concentration as a function of time in NL-70 suspensions (10 mg/L) containing different concentrations of t-butanol. Experiments were conducted at pH 7 with 2 μM initial p-CBA.
Figure 21:
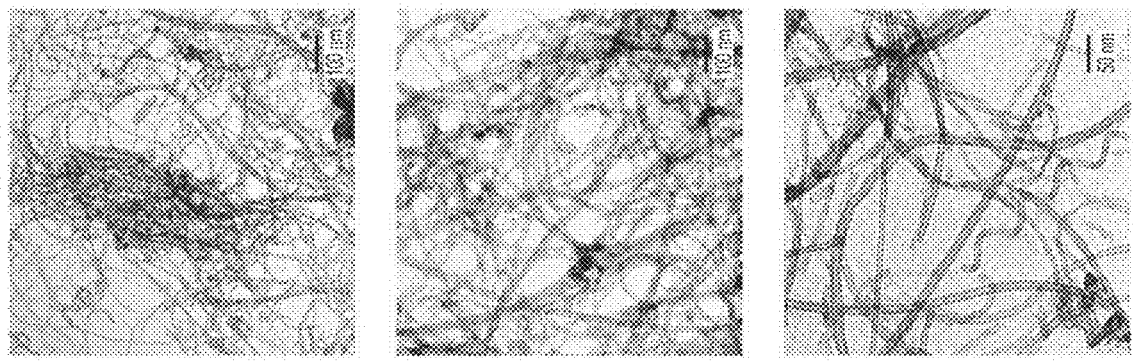

FIG. 21. TEM images of NL-NF after extended exposure (12 h) to concentrated (~20 mg/L) ozone solution. Different magnifications are shown, revealing that MWCNT structural integrity is largely maintained even after extended oxidation, with no evidence of oxidative damage readily apparent (compare these TEM images to those of as-received NL-NF in FIG. 10).

DETAILED DESCRIPTION

Commercially available single-walled (SW), double-walled (DW) and multi-walled (MW) CNTs are obtained from NanoLab, Inc. (Table 1). Functionalization with surface oxides and N-containing moieties are used to tune the acidity and basicity of CNT surfaces. These functional groups are specifically chosen due to prevailing theories in catalytic ozonation suggesting their involvement in .OH production.

TABLE 1

Characteristics of Commercially Available CNTs$^a$

| Structure | Purity | Synthesis | Length (μm) | Outer Diameter (nm) | Cost ($/g) |
|---|---|---|---|---|---|
| SWCNTs | >95% | CVD$^b$ | 1-5 | 15 ± 5 | 140 |
| DWCNTs | >95% | CVD | 1-5 | 4 ± 1 | 515 |
| MWCNTs | >95% | CVD | 1-5 | ~1.5 | 200 |

$^a$purchased from NanoLab, Inc.
$^b$Chemical vapor deposition

Surface oxidation is accomplished through reaction of as received CNTs with common oxidizing agents (e.g., nitric acid, nitric and sulfuric acid mixtures, and permanganate ($MnO_4^-$)) according to established protocols. Procedures typically call for CNT dispersion via extended sonication followed by oxidation at high temperature and long reaction times. The extent of oxidation is controlled by these conditions.

Addition of N-containing functionalities is accomplished in a similar fashion via chemical and thermal treatment of oxidized CNTs with nitrogenating agents (e.g., ammonia ($NH_3$) and urea ($NH_2)_2CO$). This approach has proven effective for the surface N-enrichment of activated carbons, and evidence suggests it also can be used to increase the basicity of CNT surfaces. More traditional routes for N-functionalization can also be employed, specifically amide addition to carboxylated CNTs.

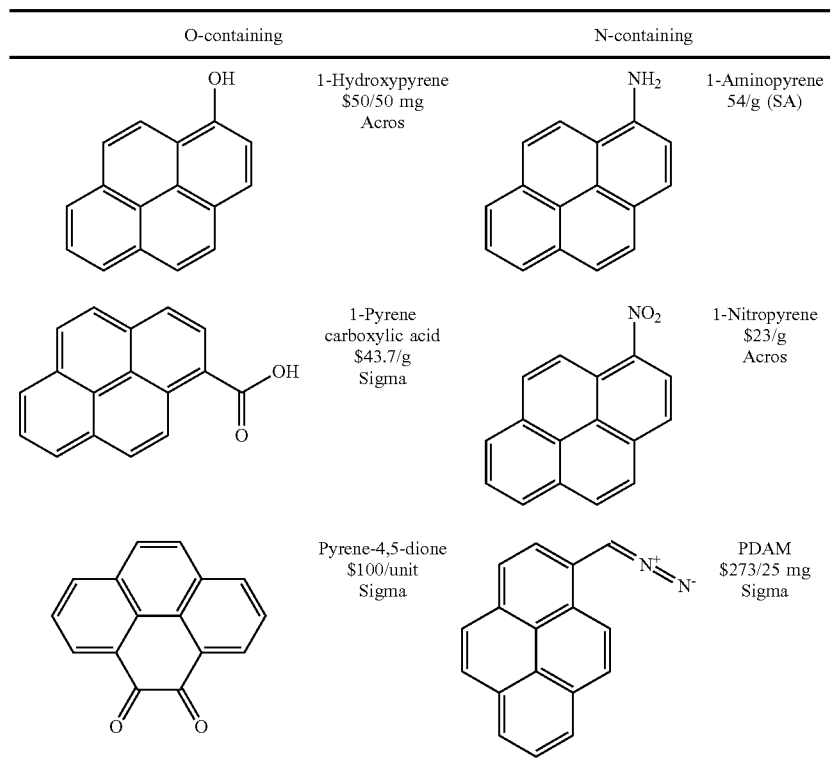

Non-Covalent Functionalization of CNTs:

To enable greater control of surface functionality, non-covalent functionalization with pyrene derivatives can be used. Dispersed aqueous suspensions of SWCNTs, DWCNTs and MWCNTs are combined with a methanolic solution of a commercially available pyrene derivative while sonicating. Pyrene is strongly physisorbed via π-π stacking, remaining surface-bound for weeks after washing. Variation in CNT and pyrene concentrations should allow the surface site density to be easily controlled. Another advantage is that pyrene exhibits strong absorbance in the UV, and thus the amount sorbed is easily quantifiable via UV/vis spectroscopy analysis and mass balance considerations. Although potentially not ideal for treatment applications, non-covalent functionalization provides relatively simple method for comparing the inherent activity of different functional groups toward $O_3$. Again, focus will be placed on oxygen and nitrogen containing functional groups. PDAM reacts readily with carboxylates, and is included as a possible route to additional functionalities. In particular, surface pyrrole groups were recently implicated in GAC activity and could be added to pyrene via PDAM reaction with pyrrole-2-carboxylic acid. Pyrene will be included as a control.

Hybrid CNT-Noble Metal Nanostructures:

Au and Pt are noted for their role as gas-phase oxidation catalysts, their relative inertness in oxidizing environments, and activity toward ozone. However, noble metals have rarely been investigated for catalytic ozonation.

Figure 1:
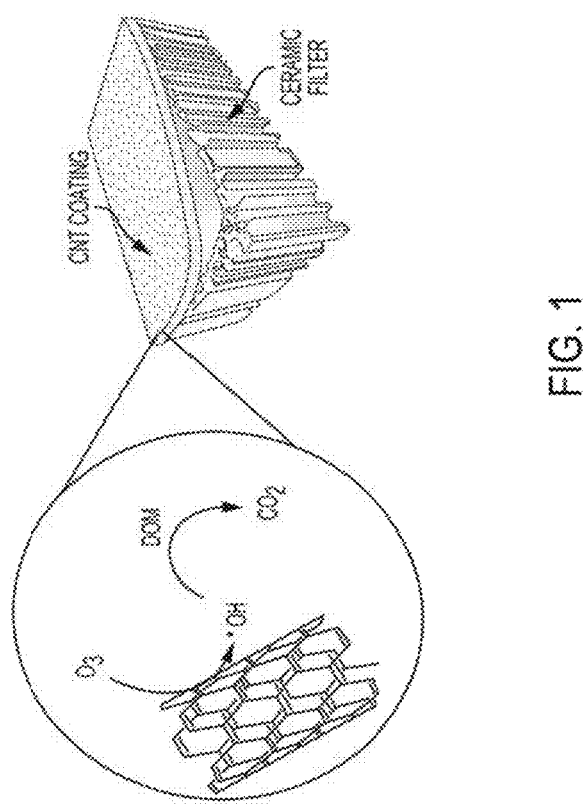
FIG. 1. a multi-purpose CNT-composite membrane. Catalytic ozonation on CNT surface can promote chemical oxidation, increasing the functionality of the technology.
Figure 2A:
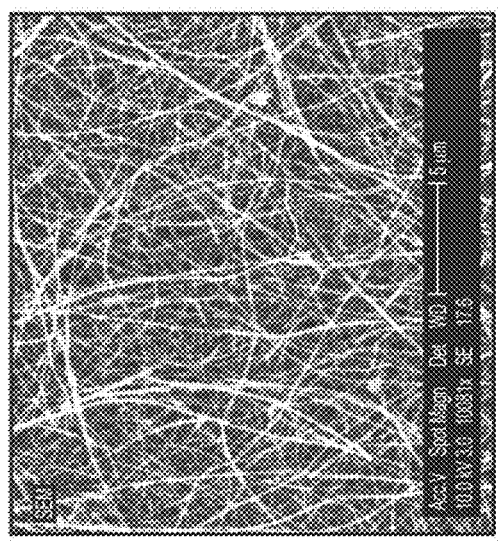
FIG. 2($a$). a SEM image of Pt/MWCNTs synthesized via $K_2PtCl_6$ reduction by ethylene glycol.
Figure 2B:
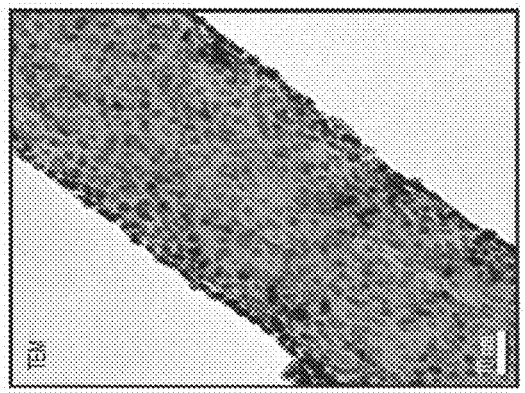

Several approaches exist for synthesis of CNT-metal heterostructures. For example, a chemical reduction deposition mechanism can be utilized. This involves first adsorbing the metal onto an oxidized CNT surface, followed by reduction with sodium borohydride, citric acid or another suitable agent. The influence of nanocrystallite size can be evaluated, since it is a factor affecting gold's catalytic activity. Crystallite size can be tuned through variations in reagent concentrations and the use of polyelectrolyte precursors prior to reduction. These methods have been applied to generate hybrid Pt/MWCNT nanostructures using ethylene glycol as a reducing agent (FIG. 2); similar methods for Au/CNT hybrids with well-defined surface structures are being developed.

Hybrid Iron Oxide-CNT Nanostructures:

Iron oxides have generated much interest for catalytic ozonation because they are earth abundant and pose little risk, are readily synthesizable, and have generally proven to be effective .OH promoters. An ideal way to take full advantage of the size-dependent OH density on nanoscale iron oxides is to support them on CNTs via hybridization. The size-controlled synthesis of goethite (α-FeOOH) and (α-$Fe_2O_3$) hematite can be used to develop heterogeneous nucleation routes for hybrid CNT-iron oxide nanomaterials. Controlled hydrolysis has been used to grow $TiO_2$ nanostructures on CNTs, and a similar approach can be used for iron oxides. By controlling the hydrolysis rate, reagent concentrations, reaction temperature, and aging time, iron oxides grown in the presence of CNTs will yield hybrid structures of variable size and crystallinity.

Characterization of Synthesized Nanostructures:

Synthesized materials can be characterized by an array of tools that will probe their bulk structure and morphology, chemical composition, surface chemistry, and solution phase stability (Table 2). X-ray photoelectron spectroscopy (XPS) will provide quantitative data regarding the elemental composition and oxidation state of the catalyst surface.

TABLE 2

Characterization Methods

| |
| --- |
| Structure and morphology |
| Scanning electron microscopy (SEM) |
| Transmission electron microscopy (TEM) |
| Bulk composition and mineralogy |
| Energy Dispersive X-ray Analysis (EDX w/SEM) |
| Selected Area Electron Diffraction (SAED w/TEM) |
| Powder X-ray diffraction (XRD) |
| Surface functionality and activity |
| X-ray photoelectron spectroscopy (XPS) |
| Attenuated total reflectance/Fourier transform infrared spectroscopy (ATR-FTIR) |
| $N_2$-BET surface area and porosity analysis |
| Solution phase character |
| Acid-base titrations |
| Zeta potential analysis |
| Sedimentation studies |

Figure 3:
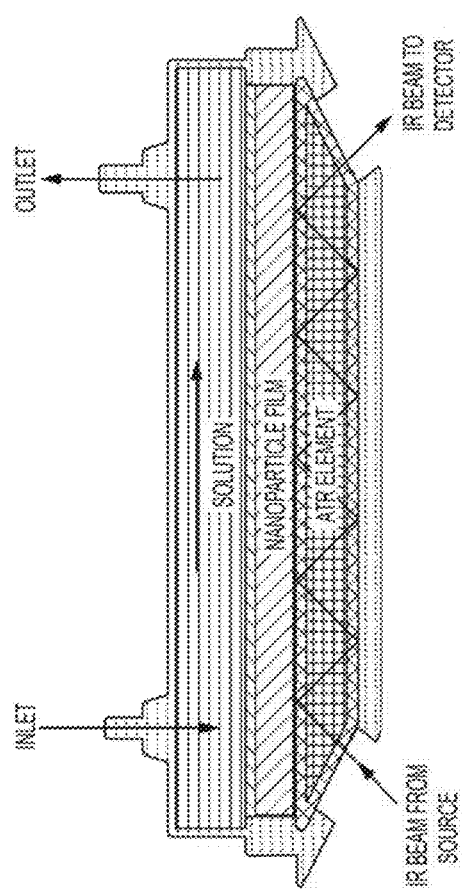
FIG. 3. a FTIR-ATR flow through cell.

A Fourier transform infrared spectrometer equipped with an attenuated total reflectance accessory (ATR-FTIR; FIG. 3) can be used. This setup, in which a thin nanoparticle film is deposited on a transparent ATR element within a flow cell, allows in situ IR analysis of the solid-solution interface, providing insights to surface protonation states and solute-catalyst interactions. Characteristic stretching frequencies for different surface functionalities are available for carbon nanotubes and analogous species, which will aide in the identification of surface groups present in solution. This approach can be useful for side-walled functionalized CNTs via pyrene addition and iron oxides, which have been extensively characterized by IR.

Characterization of all materials can be performed pre- and post-exposure to $O_3$. For pre-analysis, the goal can be to establish quantitative trends in catalyst properties (e.g., surface O and N content from XPS, acid and base surface groups from titration, etc.) arising from systematic variations during synthesis. These trends can be compared to metrics of catalyst activity measured in Task B to develop structure-activity relationships to guide future catalyst fabrication. Post-analysis will identify differences in material properties arising from exposure to $O_3$ and various aquatic matrices. This approach can help identify surface functionalities that promote .OH production and aquatic factors that may impact the long-term performance.

The selective hydroxyl radical scavenger para-chlorobenzoic acid (p-CBA) can be used to quantify .OH production from $O_3$ decomposition at nanostructure surfaces. p-CBA is commonly used in catalytic ozonation studies because it reacts readily with .OH ($k_{OH}$=5×$10^9$ $M^{-1}s^{-1}$) but exhibits very low reactivity toward ozone ($k_{O3}$≤0.15 $M^{-1}s^{-1}$). It also exhibits little sorption on carbonaceous materials. Thus, p-CBA disappearance is a reliable indirect measure of .OH production.

Rates of p-CBA decay can be measured in closed batch systems using stock solutions of $O_3$ generated from an Osmonics Series V ozone generator. Protocols and experimental conditions can be comparable to those established in catalytic ozonation studies with GAC. The involvement of radicals in p-CBA decay can be verified through the use of known inhibitors (e.g., t-butanol) and promoters (e.g., methanol) of .OH production in $O_3$ systems.

Metrics of Catalyst Activity:

Each material's catalytic activity can be measured using $R_{ct}$ values. The $R_{ct}$ concept proposed by Elovitz and von Gunten allows the relative contribution of .OH and $O_3$ to p-CBA transformation to be quantified via parallel monitoring of $O_3$ and p-CBA concentrations over time, where $R_{ct}$ values correspond to greater steady-state .OH exposure. Further, $R_{ct}$ values can be measured for other $O_3$-based processes including conventional AOPs utilizing $O_3$ (e.g., $O_3$/UV and $O_3/H_2O_2$) for .OH production. Experimentally measured $R_{ct}$ values will, therefore, represent a key metric of catalyst activity that can be optimized via tuning of nanostructure composition and surface chemistry. Other established activity measures will also be determined, including $k_D$, the first-order rate constant for $O_3$ decomposition, and the relative concentration change of p-CBA to $O_3$ ($\Delta$[p-CBA]/$\Delta$[$O_3$]), which is the ozone-normalized yield of .OH.

Catalyst and Solution Variables:

A systematic examination of catalyst activity as a function of catalyst variation can be performed. Certain specific solid- and solution phase variables are presented in Table 3.

TABLE 3

Variables in Mechanistic Studies with Model Systems (Subtask B1)

| | |
|---|---|
| Catalyst Properties | Functionalized CNTs<br>Degree of surface oxidation and nitrogenation (at least three levels)<br>Functional group identity (—OH, —COOH, —C=O, —$NH_2$, —$NO_2$ and pyrrole)<br>Functional group density (at least 3 levels for each)<br>Hybrid CNTs<br>Hybrid composition<br>(Au, Pt, $\alpha$-$Fe_2O_3$ and $\alpha$-FeOOH decorated CNTs)<br>Loading of nanostructures on CNT surfaces (at least two loadings each)<br>Size of nanostructures on CNT surfaces (at least two sizes each) |
| Solution Variables | pH (5, 7 and 9)<br>Ionic Strength (1, 10, 100 mM)<br>Catalyst loading (several between 1-500 mg/L)<br>Ozone concentration (1-6 mg/L)<br>Model inhibitors (t-butanol) and promoters (methanol) |

Comparison to Other $O_3$-Derived AOPs:

Following established protocols, a parallel set of experiments will quantify these same reactivity metrics in systems with $O_3/H_2O_2$, a more traditional AOP. Additional studies will also be conducted using a commercially available powdered and granular activated carbon. Reactivity measures from these studies will serve as a basis for assessing the benefits of CNT-based nanomaterials for use in AOPs relative to previously established methodologies.

Control Systems:

p-CBA experiments can be conducted with all catalysts in the absence of $O_3$. Production of .OH during ozonation will also be measured in systems containing individual building blocks of hybrid structures (i.e., unsupported Au, Pt and Fe oxide nanoparticles) to evaluate the performance of unsupported metal and metal oxides in catalytic ozonation, and identify potential synergies arising from attachment to CNTs.

Analytical Methods:

p-CBA can be quantified using liquid chromatography with photodiode array detection (HPLC/DAD). $O_3$ can be measured both colorimetrically and via direct spectrophotometric absorbance.

Figure 4A:
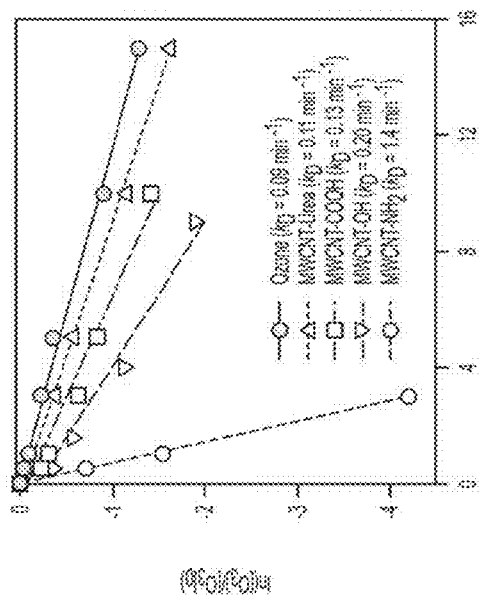
FIGS. 4$a$-$b$.
Figure 4B:
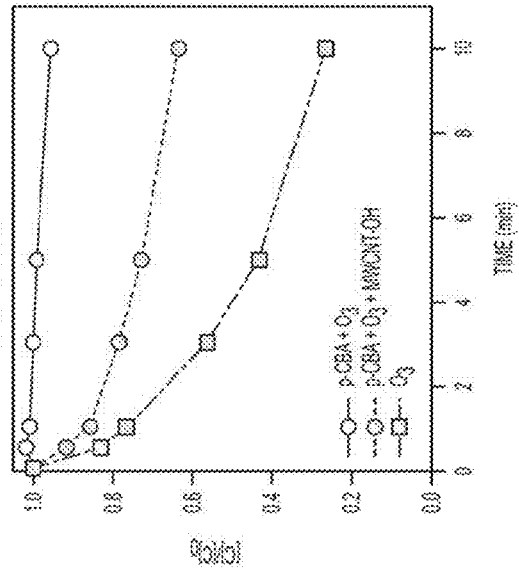

Results:

It has been shown that chemical functionalization impacts the reactivity of CNTs toward $O_3$ (FIG. 4a). Ozone decay was greatest for MWCNTs functionalized with aminopyrene (MWCNT-$NH_2$), whereas a two-fold difference in $k_D$ was observed between MWCNT-OH and MWCNT-COOH from commercial sources. Notably, all experiments were conducted at CNT loadings of 15 mg/L, whereas enhanced $O_3$ decay only occurs at GAC loadings in excess of 250 mg/L. More importantly, tests with p-CBA show that $O_3$ decay yields solution phase .OH (FIG. 4b). Parallel monitoring of p-CBA and $O_3$ in MWCNT-OH systems yields an $R_{ct}$ value of $2.5 \times 10^{-7}$ at pH 7, an order of magnitude greater than values for $O_3/H_2O_2$ and $O_3$/GAC AOPs measured under similar conditions. The greater .OH production afforded by CNTs at low catalyst loadings suggests great promise for their application in water and wastewater treatment.

Figure 5:
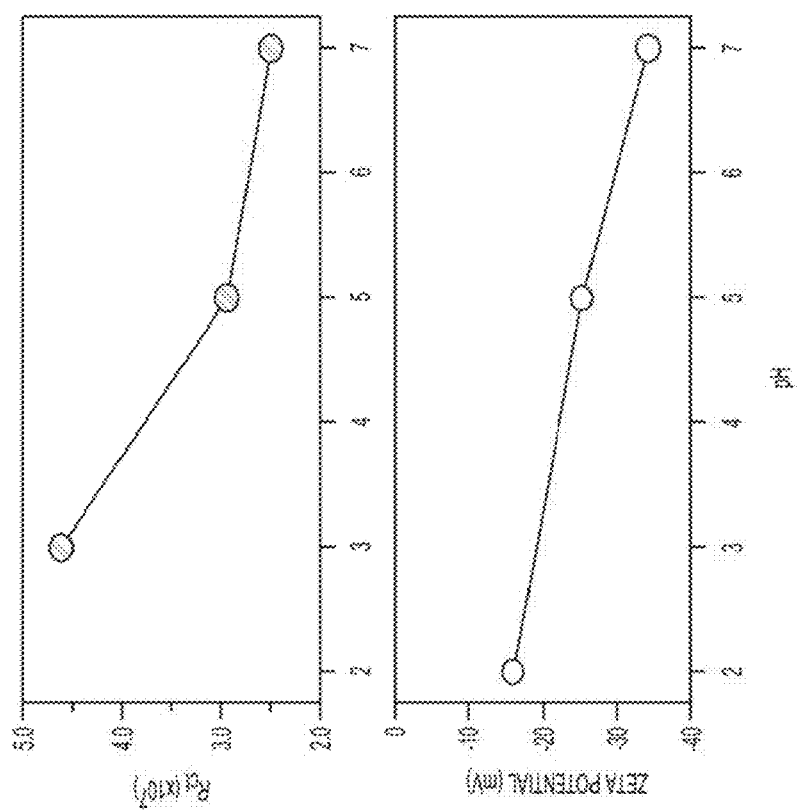
FIG. 5. $R_{ct}$ and zeta potential variation as a function of pH for MWCNT-OH; conditions identical to FIG. 4.

This evidence is consistent with .OH production depending on CNT surface chemistry. With decreasing pH, CNT surface charge approaches zero and $R_{ct}$ values increase two-fold (FIG. 5). This behavior is consistent with neutral surface functionalities (e.g., —OH) promoting .OH production. This preliminary work demonstrates promise for the ability to tune .OH yields by tailoring CNT surface chemistry.

The most promising catalyst material, determined from $R_{ct}$ values, can be further evaluated for practical performance characteristics. These experiments will (i) assess the impact of water quality on .OH production and (ii) determine the ability of CNT-based nanostructures to effectively remove target species without deleterious consequences. Experimental details are provided below and summarized in Table 4. Given the greater $O_3$ demand arising from increased system complexity, experiments can be semi-batch with a continuous $O_3$ input via a direct feed from the generator. Inlet $O_3$ concentrations can be tuned via the generator operating parameters.

TABLE 4

Variables Tested in Performance Studies (Subtask B2)

| Parameter | Constituents | Concentration | Performance Metric |
|---|---|---|---|
| Competitors | $Fe^{2+}$, $Mn^{2+}$, sulfide | 0.2, 1, 5 mM | Change in $R_{ct}$ |
| Hardness | $Ca^{2+}$, $Mg^{2+}$ | 10, 100, 200 mg/L as $CaCO_3$ | Change in $R_{ct}$ |
| Alkalinity | $HCO_3^-$/$CO_3^{2-}$ | 10, 100, 200 mg/L as $CaCO_3$ | Change in $R_{ct}$ |
| Organic Matter | Suwanee River FA & HA Elliott soil FA | 1, 10, 50 mg/L | Change in $R_{ct}$ |
| Longevity | Ozone exposure | 1-10 h | Change in $R_{ct}$ |
| Byproduct Precursor | Hypobromous acid/ hypobromite | 0.5, 5 mg/L | Bromate production |
| Model effluent organic matter | Phenytoin<br>Oxalate | 100 μM<br>1 mM | Constituent removal |
| OCSD Effluent | Activated sludge Trickling filter | To be characterized | DOC removal |

Influence of Matrix Chemistry:

Using p-CBA as a reactivity probe, system complexity can be increased through variations in water quality. Changes in $R_{ct}$ in response to systematic variations in aquatic chemistry will help establish the types of water and pretreatment steps necessary for this new technology. The quality parameters assessed include hardness, alkalinity, competitive reductants, and soil and aquatic organic matter (Elliot Soil fulvic acid and Suwanee River humic and fulvic acid). Experiments will also consider nanostructure longevity via extended $O_3$ pretreatment prior to reaction with p-CBA. With these studies, the threshold levels at which exposure to common aquatic constituents (e.g., radical scavenger carbonate) inhibits treatment efficiency, as measured by $R_{ct}$ can be determined.

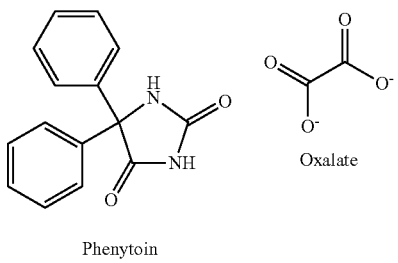 [SMILES: O=C1NC(=O)C(c2ccccc2)(c2ccccc2)N1 ; O=C([O-])C(=O)[O-]]

Phenytoin

Oxalate

Removal of Effluent Organic Matter:

Catalytic treatment of two model compounds representative of effluent organic matter (EfOM) can be evaluated from rates of removal and identification of transformation products. Phenytoin is an antiepileptic pharmaceutical that is relatively resistant to ozonation and is frequently encountered in source and finished drinking water. It is investigated because of the high probably of its presence in treated wastewater. The other species is oxalate, which is representative of assimilable organic carbon (AOC) generated during oxidation processes, which can be problematic by stimulating biological growth during reuse.

Oxidation Byproduct Mitigation:

Following established protocols, bromate formation during catalytic treatment of Br-containing waters can be evaluated. Additional studies will explore the ability of hybrid CNT nanostructures to remove bromate ($BrO_3^-$) in the absence of ozone, motivated by previous reports of $BrO_3^-$ adsorption and reduction by GAC and PAC and the superior redox character and sorption capacity of CNTs.

DOC Removal from Secondary Effluent:

The removal of dissolved organic carbon (DOC) during catalytic treatment of secondary effluent can also be investigated. The rate and extent of DOC removal can be used as the basis of comparing catalytic ozonation to alternative oxidation technologies.

Controls and other Oxidative Treatment:

For experiments probing EfOM removal, $BrO_3^-$ production and secondary effluent treatment, catalyst performance can be evaluated through comparison to traditional ozonation and $O_3/H_2O_2$ AOPs. For these traditional technologies, oxidant concentrations will reflect those typically employed in water and wastewater treatment. Where appropriate, $O_3$-free controls can be used to measure loss of target compounds by non-oxidative routes.

Analytical Methods:

Analytical methods for phenytoin and oxalate using HPLC/DAD are available, although concentrations can be greater than environmental relevance to facilitate analysis. Phenytoin transformation products can be identified using LC with mass spectrometry (LC/MS). Hypobromous acid/hypobromite, bromate and bromide can be analyzed via reaction with phenol and subsequent HPLC analysis as described by Zhang, W., et al., *Chem. Mater.* 2009, 21, 3234-3241. A total organic carbon analyzer can be used for DOC analysis in experiments with secondary effluent. Secondary effluents can be characterized via standard methods prior to use. Atomic absorption spectroscopy (AAS) can be used to measure metal loss during catalyst operation when necessary.

Characterization and reactivity studies can link hybrid nanostructure surface chemistry to performance endpoints and generate structure-activity relationships that can guide development of these materials for water purification.

The factors influencing hydroxyl radical (.OH) formation during ozonation of multi-walled carbon nanotubes (MW-CNTs) was explored and the system's viability as a next-generation advanced oxidation process (AOP) was assessed. Using standard reactivity metrics for ozone-based AOPs ($R_{CT}$ values), MWCNTs promoted .OH formation during ozonation to levels exceeding ozone (both alone and with activated carbon) and equivalent to ozone with hydrogen peroxide. MWCNTs oxidized with nitric acid exhibited vastly greater rates of ozone consumption and .OH formation relative to as-received MWCNTs. While some of this enhancement reflects their greater suspension stability, a strong correlation between $R_{CT}$ values and surface oxygen concentrations from X-ray photoelectron spectroscopy suggests that surface sites generated during MWCNT oxidation promote .OH exposure. Removal of several ozone-recalcitrant species [para-chlorobenzoic acid (p-CBA), atrazine, DEET, and ibuprofen] was not significantly inhibited in the presence of radical scavengers (humic acid, carbonate), in complex aquatic matrices and after 12 h of continuous exposure of MWCNTs to concentrated ozone solutions. As a proof-of-concept, oxidized MWCNTs deposited on a ceramic membrane chemically oxidized p-CBA in a flow through system, with removal increasing with influent ozone concentration and mass of deposited MWCNTs (in mg/cm$^2$). This hybrid membrane platform, which integrates adsorption, oxidation and filtration via an immobilized MWCNT layer, may serve as the basis for future novel nanomaterial-enabled technologies, although long-term performance trials under representative treatment scenarios are necessary.

Specific values provided below are for illustration; they do not exclude other values described herein. For Example, the following specific embodiments of the invention are provided.

In one embodiment the invention provides a water purification system or water treatment system comprising carbon nanotubes (CNTs).

In another embodiment the water treatment system is a waste water treatment system.

In another embodiment the carbon nanotubes function as an ozonation catalyst in the water purification system or water treatment system.

In another embodiment the carbon nanotubes generate hydroxyl radicals in the water purification system or water treatment system.

In another embodiment the water purification system or water treatment system comprises single walled, double walled, or multi-walled carbon nanotubes, or a combination thereof.

In another embodiment the water purification system or water treatment system comprises single walled, carbon nanotubes.

In another embodiment the water purification system or water treatment system comprises double walled carbon nanotubes.

In another embodiment the water purification system or water treatment system comprises multi-walled carbon nanotubes.

In another embodiment the water purification system or water treatment system comprises CNTs deposited on a ceramic membrane.

In another embodiment the water purification system or water treatment system comprises functionalized CNTs deposited on a ceramic membrane. In another embodiment the functionalized CNTs are carboxylated, hydroxylated, or aminated.

In another embodiment the water purification system or water treatment system comprises oxidized MWCNTs deposited on a ceramic membrane.

In another embodiment the water purification system or water treatment system integrates disinfection, adsorption, oxidation and filtration via an immobilized CNT layer.

In another embodiment the water purification system or water treatment system comprises a CNT layer integrated into an $O_3$-resistant microfilter. In another embodiment the $O_3$-resistant microfilter comprises PTFE, stainless steel, ceramic, or PVDF.

In another embodiment the water purification system or water treatment system comprises a porous mesh network or mat of CNTs. In another embodiment the porous mesh network or mat of CNTs functions as a membrane or filter.

In another embodiment the water purification system or water treatment system comprises a CNT metal composite (e.g., a noble metal or metal oxide decorated CNT).

In another embodiment the water purification system or water treatment system comprises a hybrid CNT filter that not only exposes CNTs to influent $O_3$ but also effectively immobilizes CNTs so as to limit their release into the treated supply while avoiding prohibitive levels of headloss at flows relevant to treatment.

In another embodiment the invention provides a filtration method described herein.

In another embodiment the invention provides a purification method described herein.

In another embodiment the invention provides a filtration method that utilizes a water purification system or water treatment system as described herein.

In another embodiment the invention provides a purification method that utilizes a water purification system or water treatment system as described herein.

In another embodiment the invention provides a water filtration system as described herein.

In another embodiment the invention provides a water purification system as described herein.

The invention will now be illustrated by the following non-limiting Examples.

Example 1

Introduction

Catalytic ozonation, in which a surface promotes ozone ($O_3$) decay into hydroxyl radical (.OH), is an emerging advanced oxidation process (AOPs). While metal oxides have been extensively utilized, activated carbon (AC) represents another attractive substrate because of its widespread use in water and wastewater treatment. Since its discovery, ozonation of AC has been reported to provide many of the same positive treatment outcomes associated with traditional AOPs. Nevertheless, practical application of AC during ozonation has been limited by perceived shortcomings in material properties; the vast majority (>90%) of AC surface area is internal and will not be accessible to $O_3$ via mass transfer limitations. Further, AC lacks structural integrity in highly oxidizing environments, as evidenced by loss of surface area and mesopores after its repeated ozonation. See Kasprzyk-Hordern, B., et al., *Appl. Catal. B-Environ.* 2003, 46, 639-669; Byun, S., et al., *Wat. Res.* 45, 163-170; Ernst, M., et al., *Appl. Catal. B-Environ.* 2004, 47, 15-25; Pines, D. S., et al., *Ozone-Sci. Eng.* 2003, 25, 25-39; Rosal, R., et al., *Ozone-Sci. Eng.* 33, 434-440; MWH, *Water Treatment: Principles and Design.* Wiley: New York, 2005; Jans, U., et al., *Ozone-Sci. Eng.* 1998, 20, 67-90; Alvarez, P. M., et al., *Appl. Catal. B-Environ.* 2009, 92, 393-400; Faria, P. C. C., et al., *Wat. Res.* 2005, 39, 1461-1470; Sanchez-Polo, M., et al., *Wat. Res.* 2008, 42, 4163-4171; Sanchez-Polo, M., et al., *Ozone-Sci. Eng.* 2006, 28, 237-245; Sanchez-Polo, M., et al., *Wat. Res.* 2005, 39, 3189-3198; Beltran, F. J., et al., *J Haz. Mater.* 2009, 163, 768-776; Beltran, F. J, et al., *Ind. Eng. Chem. Res.* 2002, 41, 6510-6517; Alvarez, P. M., et al., *Ind. Eng. Chem. Res.* 2008, 47, 2545-2553; Alvarez, P. M., et al., *Carbon* 2006, 44, 3102-3112; and Valdés, H., et al., *Langmuir* 2002, 18, 2111-2116.

Recently, several studies have explored carbon nanotubes (CNTs) as an alternative to AC, demonstrating that they can, in fact, promote .OH formation in an analogous manner during ozonation. Relative to AC, CNTs possess significantly higher external surface area, and their surfaces can be chemically functionalized to potentially optimize the density of surface sites responsible for .OH formation. Based upon their growing application in catalysis, CNTs are also known to be relatively stable in extreme environments and thus are more likely to maintain mechanical integrity during ozonation. See Liu, Z.-Q., et al., *Appl. Catal. B-Environ.* 2010, 101, 74-80; Liu, Z.-Q., et al., *Sep. Purif. Technol.* 2011, 78, 147-153; Liu, Z.-Q., et al., *Appl. Catal. B-Environ.* 2009, 92, 301-306; Rocha, R. P., et al., *Appl. Catal. B-Environ.* 104, 330-336; Goncalves, A. G, et al., *Carbon* 2010, 48, 4369-4381; Fan, X., et al., *Chem. Eng. J.* 2014, 241, 66-76; Tasis, D., et al., *Chemical Reviews* 2006, 106, 1105-1136; and Zhang, W., et al., *Chem. Mater.* 2009, 21, 3234-3241.

Nevertheless, outstanding questions challenge the viability of using CNTs in combination with $O_3$ as a next-generation AOP. Practical performance hurdles encompass those typical for AOPs including whether performance is maintained in complex matrices, especially because the majority of work thus far has employed idealized systems that deviate from norms of treatment systems (e.g., pH 3 or at high temperature and pressure). Also, aside from isolated comparisons to AC, it is not yet understood how ozonation of CNTs compares to more traditional AOPs such as $O_3$ with $H_2O_2$. Finally, due to concerns over the inadvertent release of engineered nanomaterials into the environment, it seems unlikely that CNTs will ever be deployed in treatment applications as suspensions, which have been exclusively used in laboratory studies. Accordingly, the eventual use of CNTs in treatment will likely require alternative application platforms that better limit the risk of nanomaterial release. See Liu, Z.-Q., et al., *Appl. Catal. B-Environ.* 2010, 101, 74-80; Liu, Z.-Q., et al., *Sep. Purif. Technol.* 2011, 78, 147-153; Liu, Z.-Q., et al., *Appl. Catal. B-Environ.* 2009, 92, 301-306; Rocha, R. P., et al., *Appl. Catal. B-Environ.* 104, 330-336; and Goncalves, A. G, et al., *Carbon* 2010, 48, 4369-4381.

During application, it must also be recognized that ozone will oxidize the CNTs, thereby increasing their surface oxygen concentration over time. As such, clearly understanding the influence of surface oxygen on CNT reactivity is paramount for predicting performance and technology longevity. However, studies to date have provided conflicting results. Liu and co-workers found that increased surface oxidation decreased CNT reactivity, whereas Goncalves et al. observed little difference in the reactivity of oxidized and non-oxidized CNTs. We note that a complicating factor overlooked in prior studies is the interdependence between CNT surface oxidation and suspension stability. Because CNT oxidation increases their dispersion in suspension, reported changes in reactivity as a function of surface oxidation may be confounded by differences in reactive surface area available in CNT suspensions. Thus, distinguishing between the influence of CNT surface chemistry and CNT aggregation state on reactivity is critical to the design of optimal materials for sustained .OH formation. See Goncalves, A. G, et al., *Carbon* 2010, 48, 4369-4381; Fan, X., et al., *Chem. Eng. J.* 2014, 241, 66-76; Tasis, D., et al., *Chemical Reviews* 2006, 106, 1105-1136; Zhang, W., et al., *Chem. Mater.* 2009, 21, 3234-3241; Burda, C., et al., *Chem. Rev.* 2005, 105, 1025-1102; Hou, P.-X., et al., *Carbon* 2008, 46, 2003-2025; Rosca, I. D., et al., *Carbon* 2005, 43, 3124-3131; and Smith, B., et al., *Langmuir* 2009, 25, 9767-9776.

The aforementioned gaps related to the use of multi-walled carbon nanotubes (MWCNTs) to enhance .OH exposure during ozonation have been addressed. Working in model and representative aquatic systems, the reactivity of standard ozone-based treatment systems ($O_3$, $O_3/H_2O_2$, and $O_3/AC$) were compared to the performance of $O_3$ in combination with as-received (i.e., non-functionalized) MWCNTs and MWCNTs functionalized with various strengths of nitric acid to systematically vary their surface oxidation state. To complement reactivity studies, characterization of MWCNT surface chemistry by X-ray photoelectron spectroscopy (XPS) and suspension aggregation state by sedimentation studies and dynamic light scattering (DLS) allowed the influence of surface oxidation on MWCNT reactivity to be assessed. Beyond model systems (phosphate buffer with the radical probe para-chlorobenzoic acid and model scavenger t-butanol), performance validation included reactivity tests across solution chemistries (alkalinity up to 250 mg/L as $CaCO_3$, dissolved organic matter up to 5 mg/L as Suwanee Rivers Humic Acid, and partially treated Iowa River water), removal studies with a suite of $O_3$-recalcitrant pollutants (atrazine, ibuprofen, and DEET), and longevity studies exploring MWCNT activity after 12 h of continuous exposure of MWCNT suspensions (150 mL at 0.5 g/L) to concentrated $O_3$ solutions. Finally, the viability of a hybrid filter platform was demonstrated for chemical oxidation, in which an immobilized MWCNT layer deposited on a ceramic microfiltration membrane was able to degrade $O_3$-recalcitrant species when in contact with an $O_3$-containing feed solution.

Experimental

Reagents List.

All reagents were used as received unless otherwise indicated. Ozonation experiments used para-chlorobenzoic acid (p-CBA) (Sigma Aldrich; 99%), tert-butanol (Sigma Aldrich; ≥99%), anhydrous sodium sulfite (Sigma Aldrich; ≥98.0%) and potassium phosphate monobasic (Sigma Aldrich; ≥99%). Micropollutants considered were atrazine (Fluka; 99.1%), ibuprofen (Sigma Aldrich; 98.0), and DEET (Fluka; 97.6%). Ozone concentrations were measured colorimetrically using potassium indigo trisulfonate, phosphoric acid (ACS reagent, ≥85 wt. % in $H_2O$), and methanol (HPLC grade). All solutions were prepared in deionized water (Millipore, Q-Grad 2). Phosphate buffer solutions were pre-treated with ozone to remove any organic matter in the solution prior to use in experimentation. MWCNTs were acquired from CheapTubes.com (Brattleboro, Vt.) and Nanolabs, Inc (Waltham, Mass.).

Batch Experiments for Quantifying .OH Production During Ozonation.

Experiments used both as-received (or non-functionalized) MWCNTs and MWCNTs that were oxidized using established protocols with nitric acid ($HNO_3$). MWCNTs will heretofore be referenced by commercial source (NL for Nanolabs, CT for Cheaptubes) and the strength of acid used in functionalization (e.g., "NL-NF" refers to non-functionalized MWCNTs from NanoLabs, Inc., whereas "CT-70" refers to MWCNTs from CheapTubes.com oxidized with 70% $HNO_3$). Stock suspensions of MWCNTs were prepared and handled as described in the SI.

Experimental conditions were chosen to mimic those used previously in catalytic ozonation studies with granular activated carbon (GAC) to facilitate comparison of our results with MWCNTs to these earlier studies. Reactions were conducted at room temperature (22° C.±3° C.) in suspensions of MWCNTs (1-40 mg/L) that were well-dispersed via mixing with a magnetic stir bar and stir plate. Suspensions were buffered at pH 7.0 (5 mM phosphate), and no pH change was observed during experiments. Reactors contained 2 μM of p-CBA as an .OH probe; it reacts quickly with .OH ($k_{p\text{-}CBA/.OH}=5\times10^9$ $M^{-1}s^{-1}$), shows little reactivity toward $O_3$ ($k_{p\text{-}CBA/O3}\le0.15$ $M^{-1}s^{-1}$) and does not sorb significantly on most organic materials (Sanchez-Polo, M., et al., *Ozone-Sci. Eng.* 2006, 28, 237-245). Accordingly, decreases in p-CBA concentration represent an indirect measure of .OH production. The use of p-CBA also facilitates quantification of $R_{CT}$ values, defined as the total exposure to .OH relative to the total $O_3$ exposure during ozonation. As further discussed in the SI, $R_{CT}$ values provide a single reactivity metric for comparing .OH formation in different $O_3$-based AOPs, where larger $R_{CT}$ values indicate a greater .OH exposure in solution. See Smith, B., et al., *Langmuir* 2009, 25, 9767-9776; Sanchez-Polo, M., et al., *Wat. Res.* 2006, 40, 3375-3384; Yao, C. C. D., et al., *Wat. Res.* 1991, 25, 761-773; Neta, P., et al., *Adv. Chem. Ser.* 1968, 81, 222-230; and Elovitz, M. S., et al., *Ozone-Sci. Eng.* 1999, 21, 239-260.

Unless otherwise indicated, reactors also contained 320 μM of t-butanol as a model .OH scavenger. As is discussed in the SI (see FIG. 10 and accompanying discussion), inclusion of t-butanol was necessary, as experiments conducted in its absence proceeded too quickly to observe p-CBA decay [i.e., all p-CBA was consumed by our first sampling point (<10 sec)]. Alternatively, much higher concentrations (1.6 mM or ~120 mg/L) almost entirely suppressed p-CBA decay (i.e., .OH formation). Ultimately, 320 μM was used consistently across all reactors to match the t-butanol concentration used in aforementioned $O_3$/GAC studies. Further, this value was sufficient to entirely inhibit p-CBA decay in $O_3$-only systems (i.e., in MWCNT-free controls) over the timescales of reaction in $O_3$-containing MWCNT suspensions. Accordingly, any increase in p-CBA decay observed in the presence of MWCNTs could reasonably be attributed their ability to promote .OH formation.

To initiate reaction, an aliquot of the concentrated $O_3$ stock solution (prepared as described in the SI) was added to the MWCNT suspension (20 mL) to achieve a concentration between 80 and 240 μM (3.8 mg/L to 11.5 mg/L). Samples were then collected periodically over time. Samples for p-CBA analysis were quenched with excess sulfite ($NaSO_3$ at 2- to 4-molar excess of initial $O_3$) to consume residual $O_3$. The quenched sample was then passed through a 0.2 μm Nylon syringe-driven filter (P. J. Cobert) to remove suspended MWCNTs, with tests confirming that filtration had no effect on p-CBA stability or analysis. Samples were transferred to 2.5 mL amber autosampler vials for immediate analysis via HPLC. Separate samples for $O_3$ analysis were taken simultaneously, in which an aliquot of suspension was added directly to vials containing indigo trisulfonate solution and stored in the dark until analysis.

Control systems are described fully below. They included $O_3$-free experiments to determine the extent of p-CBA sorption onto MWCNTs, experiments conducted with $O_3$ in the absence of MWCNTs to quantify p-CBA loss via direct reaction with ozone, and experiments using supernatants removed from MWCNT suspensions after centrifugation to ensure .OH formation was not attributable to dissolved species leaching from the MWCNT surface.

Performance Testing of $O_3$/MWCNTs as an Alternative AOP.

Additional reactivity studies assessed the viability of CNT ozonation for treatment. These included (i) performance comparisons to conventional ozone-based AOPs including $O_3$ with $H_2O_2$ or GAC; (ii) experiments exploring the removal of $O_3$-recalcitrant atrazine, ibuprofen, and DEET; (iii) reactivity studies with p-CBA conducted in the presence of known radical scavengers carbonate (added as sodium bicarbonate at concentrations up to 250 mg/L as $CaCO_3$) and humic acid (up to 5 mg/L of Suwanee River Humic Acid or SRHA), as well as partially treated Iowa River water obtained from the University of Iowa Water Treatment Plant (UIWTP; also conducted with atrazine); and (iv) longevity studies using samples of NL-NF and NL-70 taken from suspensions (150 mL of 0.5 g/L) that had been continuously exposed to concentrated (~20 mg/L) $O_3$ stock solutions for up to 12 h. Specifics of these performance validation studies, which are generally comparable to the aforementioned experimental design, are described below.

Demonstration of a CNT Hybrid Filter for Chemical Oxidation.

A known mass of NL-70 was dispersed in DI water and then vacuum deposited onto an Anopore Anodisc (anodic aluminum oxide; 47 mm diameter; 0.2 µm pore size) support membrane to create a CNT-hybrid filter. The deposited layer was then air dried overnight and subsequently exposed to p-CBA solutions identical to those used in batch testing. Performance variables tested in this flow-through set-up included influent ozone concentration (up to 8 mg/L) and deposited CNT mass (0.2 and 0.5 mg/cm$^2$). Test solutions were drawn through the hybrid filter using a standard vacuum pump that produced flowrates of 1.0 and 0.5 mL/min for 0.2 and 0.5 mg/cm$^2$ filters, respectively. Samples were taken of the influent (i.e., prior to passing it through the filter) and effluent solution (i.e., after passing through the filter) to quantify the change in p-CBA concentration resulting from a single pass through the deposited CNT layer.

Analytical Methods and MWCNT Characterization.

The concentration of $O_3$ in stock solutions was measured via UV/vis spectrometry ($\varepsilon$=2900 L/mole/cm @ 258 nm), while lower concentrations in reactors were measured colorimetrically using indigo trisulfonate. See Bader, H., et al., *Wat. Res.* 1981, 15, 449-456. Concentrations of p-CBA were quantified using HPLC with diode array detector (HPLC/DAD). MWCNTs were characterized via imaging with transmission electron microscopy (TEM), scanning electron microscopy (SEM), $N_2$ BET adsorption isotherm measurements, and X-ray photoelectron spectroscopy (XPS). MWCNTs suspensions were characterized via dynamic light scattering (DLS), zeta potential analysis, and sedimentation studies. Additional details of these analytical approaches and characterization techniques are provided below.

Results and Discussion

Characterization of MWCNTs and their Suspensions.

Figure 11A:
FIGS. 11$a$-$b$. TEM images of as received multi-walled carbon nanotubes from FIG. 11($a$) CheapTubes.com (CT-NF) and FIG. 11($b$) NanoLabs, Inc (NL-NF). The outer diameter (OD) of MWCNTs generally fell within the range expected from the vendor (15±5 nm for NL and between 20-30 nm for CT). Length and inner diameters were not quantified via TEM imaging, with vendor reported lengths of 1-5 μm and 10-30 μm for NL and CT, respectively, and inner diameters of 7±2 nm and 5-10 nm for NL and CT, respectively.
Figure 11B:
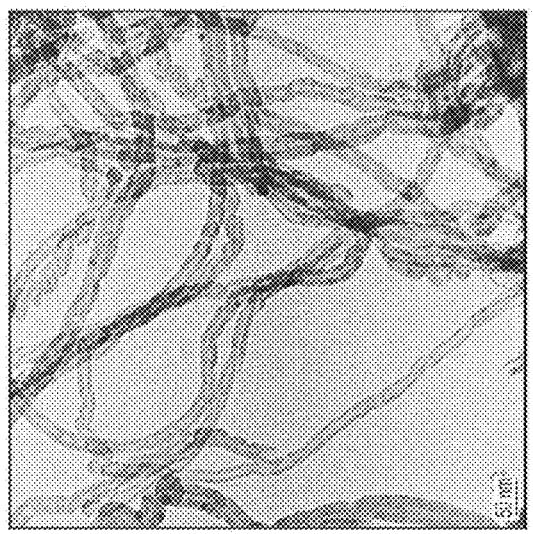
Figure 12:
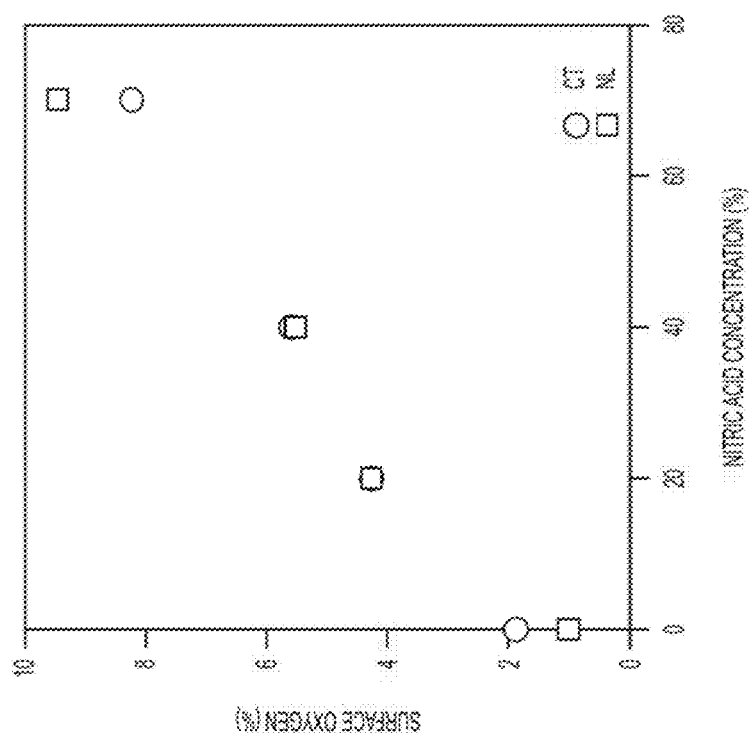
FIG. 12. Surface oxygen concentration in atomic percent (from O1(s) region of XPS) as a function of the strength of nitric acid (%) used during MWCNT functionalization. A direct linear relationship is evident between total surface oxygen and strength of $HNO_3$, and the extent of oxidation at a specific $HNO_3$ concentration was comparable on MWCNTs from each vendor. The non-zero y-intercept, indicating that as-received CNTs possess a limited amount of surface oxygen, which may contribute to the limited reactivity toward p-CBA observed during ozonation of non-functionalized CNT systems.

MWCNT dimensions and morphology matched expectations from the vendor (FIG. 11), with measured specific surface areas from $N_2$-BET of 250 and 280 m$^2$/g for dry powders of NL and CT MWCNTs, respectively. Surface chemical composition via XPS revealed no elements other than C and O despite vendor specifications of minor impurities from catalysts used during synthesis [e.g., vendor SEM/EDX analysis suggests Fe (0.94% w/w) and S (0.14%) for NL MWCNTs and Ni (0.94), Cl (0.45%), and Fe (0.26%) for CT], suggesting such impurities are primarily located in the MWCNT interior. See Wepasnik, K. A., et al., *Carbon* 2011, 49, 24-36. A roughly linear relationship was observed between MWCNT surface atomic oxygen concentration, as quantified by the O(1s) region from XPS, and the strength of $HNO_3$ used during functionalization (FIG. 12). No other changes in MWCNT morphology or composition were evident in oxidized samples relative to as-received materials.

Figure 13A:
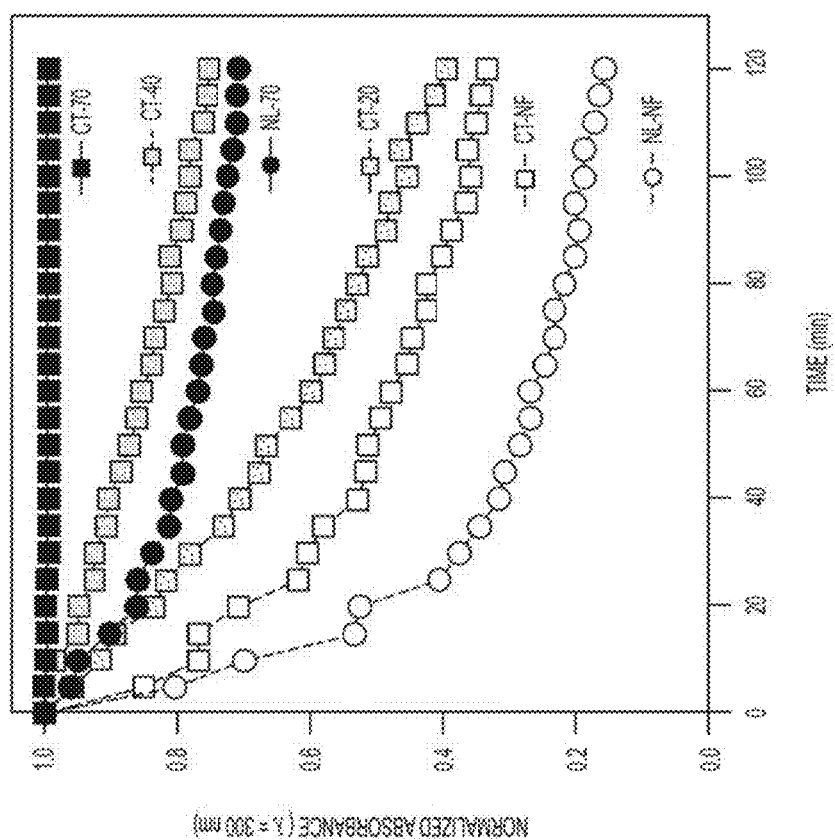
FIG. 13a-c.
Figure 13B:
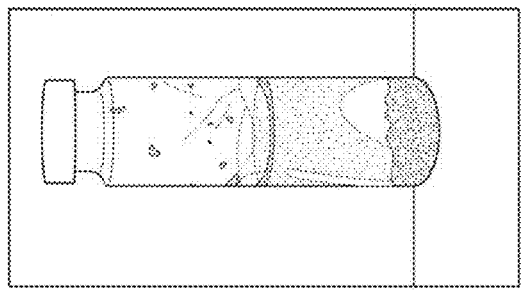
Figure 13C:
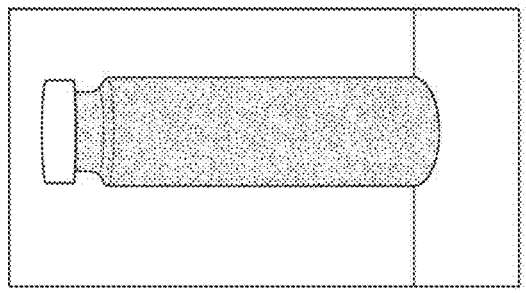
Figure 14:
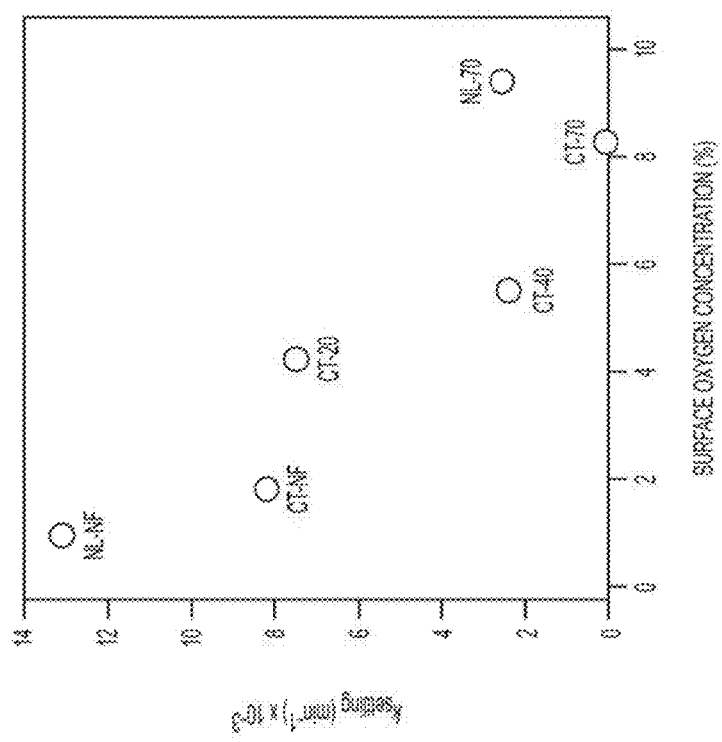
FIG. 14. First-order rate coefficients for MWCNT settling ($k_{settling}$ values) as a function of surface oxygen concentration (in atomic % as quantified by the O(1s) region via XPS). Values $k_{settling}$ were quantified by using an exponential decay model to fit the sedimentation data shown in FIG. 12. Generally, suspensions with oxidized MWCNTs were more stable, an indicated by the decrease in $k_{settling}$ values observed with increasing surface oxidation. The impact of this change in MWCNT aggregation state on their reactivity toward ozone is addressed in the main text.
Figure 15:
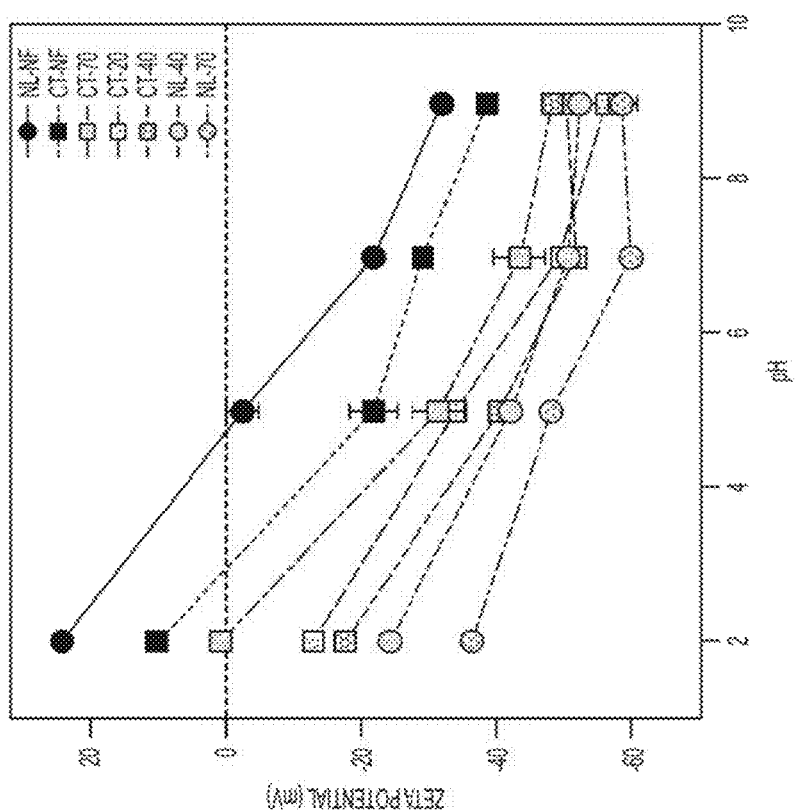
FIG. 15. Zeta potential of MWCNT suspensions as a function of pH for CT and NL exhibiting various degrees of surface oxidation. All solutions were prepared using 5 mM phosphate buffer, adjusted to the indicated pH value. MWCNT concentrations were adjusted so that the final suspensions used in analysis exhibited an absorbance between 0.3 and 0.35 at 546 nm. Values shown are the means and standard error for five readings. The results show that the zeta potential on all MWCNTs decreases (i.e., becomes more negative) with increasing pH. Also, oxidized MWCNTs tend to exhibit more negative zeta potential values at all pH relative to as-received or non-functionalized MWCNTs. Results support the surface sites present on oxidized MWCNTs (e.g., surface carboxyl and hydroxyl groups) are deprotonated at the pH value (pH 7) used in reactivity studies with ozone.

As observed elsewhere, increasing surface oxidation resulted in greater MWCNT dispersion and suspension stability. Mean hydrodynamic diameters from DLS for suspensions of CT-70 and NL-70 were two orders of magnitude smaller than those in suspensions of as-received materials (Table 5). A lower degree of aggregation (i.e., greater suspension stability) for oxidized MWCNTs was also reflected in sedimentation studies (FIGS. 13 and 14), in which as-received suspensions settled more rapidly than their oxidized counterparts. Consistent with these stability trends, oxidized MWCNTs were more negatively charged at all pH values than their non-functionalized analogues (FIG. 15). Further, zeta potential values became more negative with increasing pH, consistent with deprotonation of ionizable oxygen-containing moieties on the MWCNT surface (e.g., hydroxyl and carboxyl groups). Notably, the surfaces of all MWCNTs were negatively charged at pH 7, which was used in subsequent ozonation studies.

Ozone Decay and Hydroxyl Radical Formation in MWCNT Suspensions.

FIG. 6 shows degradation of $O_3$ (FIG. 6a) and p-CBA (FIG. 6b) in suspensions (20 mg/L) of CT and NL MWCNTs. Data are presented for as-received (CT-NF and NL-NF) and nitric acid oxidized (CT-70 and NL-70) MWCNTs reacted with 160 µM ozone. Data from a system with only $O_3$ (i.e., without MWCNTs) are provided for comparison.

All types of MWCNTs enhanced $O_3$ decay compared to systems without MWCNTs, and CT and NL MWCNTs exhibited essentially identical reactivity toward $O_3$. Because suspensions were well-mixed so as to sufficiently disperse all available MWCNT mass, results indicate that oxidized MWCNTs were considerably more reactive per unit mass than as-received MWCNTs, nearly completely consuming $O_3$ over two minutes. Assuming exponential decay (regression fits shown in FIG. 6a), rate constants for ozone decay ($k_{O3}$ values) were enhanced 3-fold and 8-fold with as-received and oxidized MWNCTs, respectively.

Corresponding p-CBA data (FIG. 6b) suggest that $O_3$ decay is accompanied by .OH formation in most, but not all, MWCNT systems. Sustained .OH production was observed in CT- and NL-70 systems, for which the rates and extents of p-CBA decay were essentially identical and closely mirrored $O_3$ consumption. Results from all control experiments were consistent with this p-CBA loss being attributable to chemical oxidation with .OH generated via $O_3$ decomposition (e.g., sorption losses for p-CBA were negligible, particularly on oxidized MWCNTs, while MWCNT supernatants were unreactive). In contrast, CT- and NL-NF systems demonstrated that $O_3$ decay can occur without corresponding .OH formation. While $O_3$ consumption in NL-NF systems resulted in no reactivity toward p-CBA, CT-NF suspensions produced a near-immediate, roughly 25% drop in p-CBA after which its concentration remained relatively stable. These observations of $O_3$ decay without corresponding .OH formation (i.e., p-CBA loss) may suggest that $O_3$ degrades on non-functionalized MWCNTs via a mechanism that does not yield .OH. An alternative scenario, addressed subsequently, is that non-functionalized MWCNT surfaces may represent better .OH scavengers, which would limit the .OH available to react with p-CBA.

Comparison of $O_3$/MWCNT to $O_3$-Based AOPs.

Figure 16:
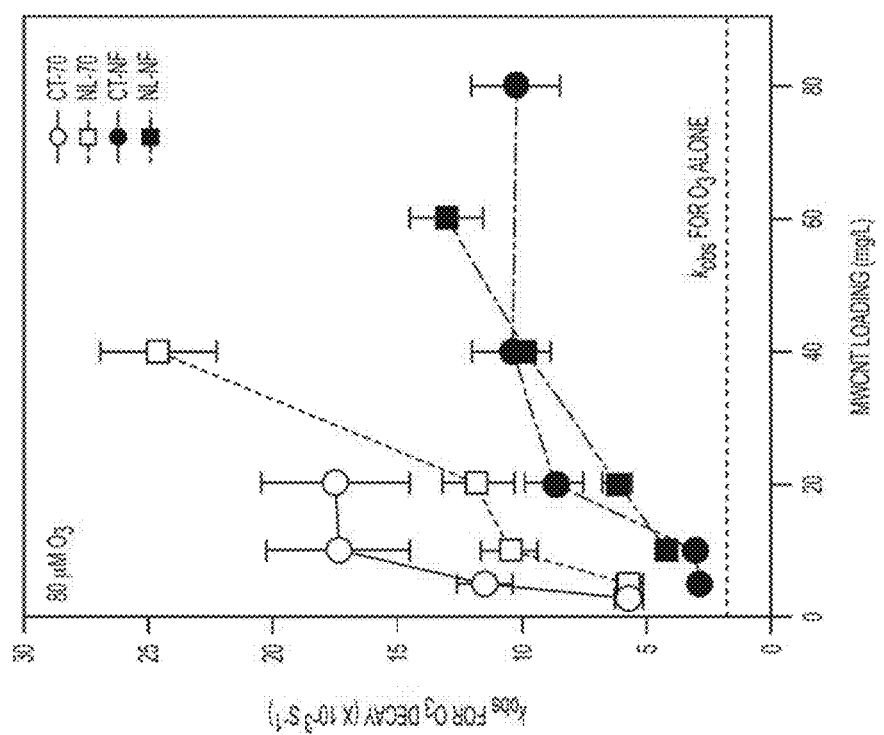
FIG. 16. Pseudo-first-order rate constant for ozone decay ($k_{obs}$ value) via reaction with MWCNTs as a function of MWCNT solid loading. Results are shown for CT-NF, NL-NF, CT-70 and NL-70. Also provided for comparison is the rate constant for ozone decay in a system free of MWCNTs (dashed horizontal line). Uncertainties represent the 95% confidence interval associated with the regression analysis used to quantify the value of $k_{obs}$. Results show that the rate of ozone decay typically increased with increasing MWCNT concentration in suspension. Also, oxidized MWCNTs were always more reactive toward ozone than their non-oxidized counterparts. Interestingly, while NL MWCNTs showed the expected monotonic increase in $k_{obs}$ values with increasing solid loading, both CT-NF and CT-70 appeared to reach a regime in which the rate coefficient was independent of the MWCNT concentration (i.e., a zero-order dependence on MWCNT mass or reactive surface area). Such behavior with increasing CT-NF and CT-70 concentrations may indicate the presence of a large excess of MWCNT surface sites in these systems that are suitable for $O_3$ consumption.
Figure 17:
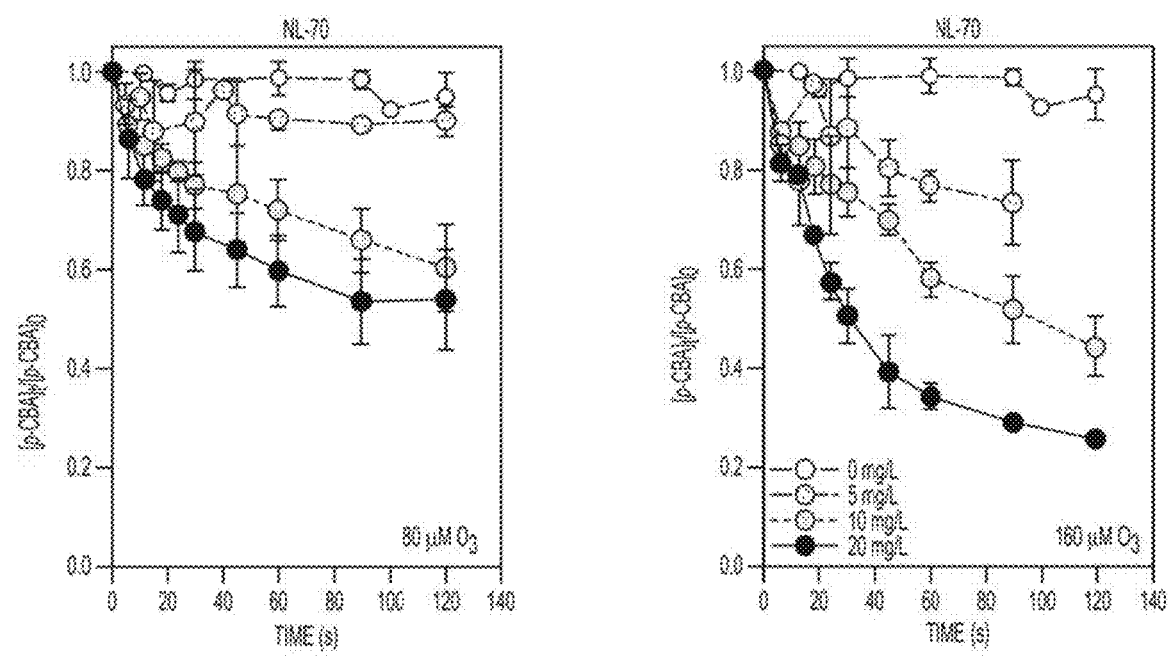
FIG. 17. Normalized p-CBA concentration as a function of time in NL-70 suspensions. Data are shown as a function of MWCNT and initial ozone concentration. Uncertainties represent one standard deviation determined from at least triplicate analyses. Data were collected in systems with 20 mg/L of MWCNT, and an initial $O_3$ concentration of either 80 μM (left) or 160 μM (right). Data are consistent with .OH formation being a surface-mediated process, with the rate and extent of p-CBA decay generally scaling with MWCNT concentration. Differences in the total amount of p-CBA loss over the course of the reaction are attributable to the different initial concentration of ozone used in each system. As discussed in the main text (see FIG. 7c) the amount of p-CBA degraded per unit ozone consumed is constant in these systems. Thus, the amount of p-CBA loss observed in systems with an initial ozone concentration of 80 μM is limited by this stoichiometry (i.e., almost all of the ozone is consumed over the timescales shown, thus there are no oxidizing equivalents available to further degrade the remaining p-CBA). At higher initial concentrations of ozone (160 μM), this limitation in oxidizing equivalents is relieved, and greater removal of p-CBA is observed.

FIG. 7a compares $R_{CT}$ plots for CT-70 and NL-70 suspensions, $O_3$ in the absence of MWCNTs, a combination of $O_3$ and GAC (40 mg/L), and a 1:1 molar ratio (at 160 μM) of $O_3$ and $H_2O_2$. Relative to $O_3$ alone, the GAC suspension provided a modest, 2-fold enhancement in .OH exposure, comparable to the 5-fold increase reported by Sanchez-Polo, M., et al., *Wat. Res.* 2005, 39, 3189-3198 with 500 mg/L of GAC. In contrast, $R_{CT}$ values for suspensions of CT-70 and NL-70 were 30-fold greater than $O_3$ alone and an order of magnitude greater than observed for $O_3$/GAC. Both types of oxidized MWCNTs also produced .OH nearly equivalent to 1:1 $O_3$/$H_2O_2$, with all three AOP systems exhibiting essentially overlapping $R_{CT}$ plots (FIG. 7a). Moreover, as is clearly seen for NL-70 in FIG. 7b, $R_{CT}$ values generally increased with CNT loading in a matter essentially independent of initial $O_3$ concentration. These mass-dependent trends in $R_{CT}$ are consistent with a surface-mediated process, and they result from similar increases in $k_{O3}$ (FIG. 16) and the rate of p-CBA decay (FIG. 17) with increasing MWCNT suspension concentration. We postulate that the plateau in $R_{CT}$ observed at the two highest CT-70 loadings may indicate steady-state .OH formation and consumption (i.e., scavenging) that prevents further increase in .OH exposure.

Another metric commonly reported for $O_3$-based AOPs is the change in p-CBA concentration relative to the change in $O_3$ concentration when both are measured at that same point along the reaction coordinate (i.e., [Δp-CBA]/[Δ$O_3$]). This ratio, which estimates the effective exposure of .OH per unit $O_3$ consumed, is presented in FIG. 7c for CT-70 and NL-70 suspensions, as well as the 1:1 $O_3$/$H_2O_2$ system. In all cases, this ratio is roughly constant throughout the reaction, but most importantly, it is essentially equal in magnitude across systems (average [Δp-CBA]/[Δ$O_3$] values range between 9.8 (±0.5)×$10^{-3}$ to 1.25 (±0.08)×$10^{-2}$). Notably, these values are nearly identical to those reported by Sanchez-Polo, M., et al., *Wat. Res.* 2005, 39, 3189-3198 for various $O_3$-based oxidation processes including GAC-enabled catalytic ozonation. The uniformity in [Δp-CBA]/[Δ$O_3$] values suggests similarities in the relative rates of .OH production and consumption via scavenging across all systems, and that MWCNTs, especially those with extensive surface oxidation, can produce .OH exposures during ozonation to levels commensurate with $H_2O_2$ and GAC.

Optimization of .OH Production with Increasing MWCNT Surface Oxidation.

Figure 18A:
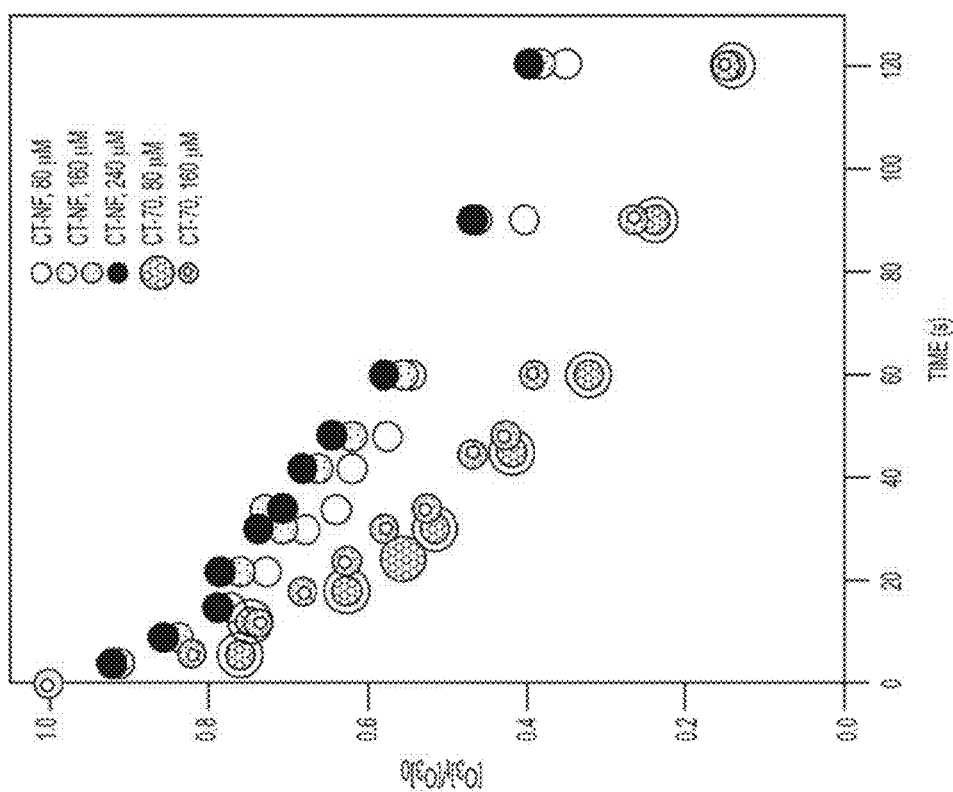
FIGS. 18a-b. Normalized concentrations profiles for FIG. 18(a) $O_3$ and FIG. 18(b) p-CBA as a function of time in CT- and CT-70 suspensions (20 mg/L) containing a range of initial $O_3$ concentrations (from 80-320 μM). Representative data are shown. As discussed in the main text, while p-CBA formation is independent of initial ozone concentration in CT-NF systems, a two-fold increase in initial ozone produced a corresponding 2-fold increase in p-CBA removal in CT-70 suspensions.
Figure 18B:
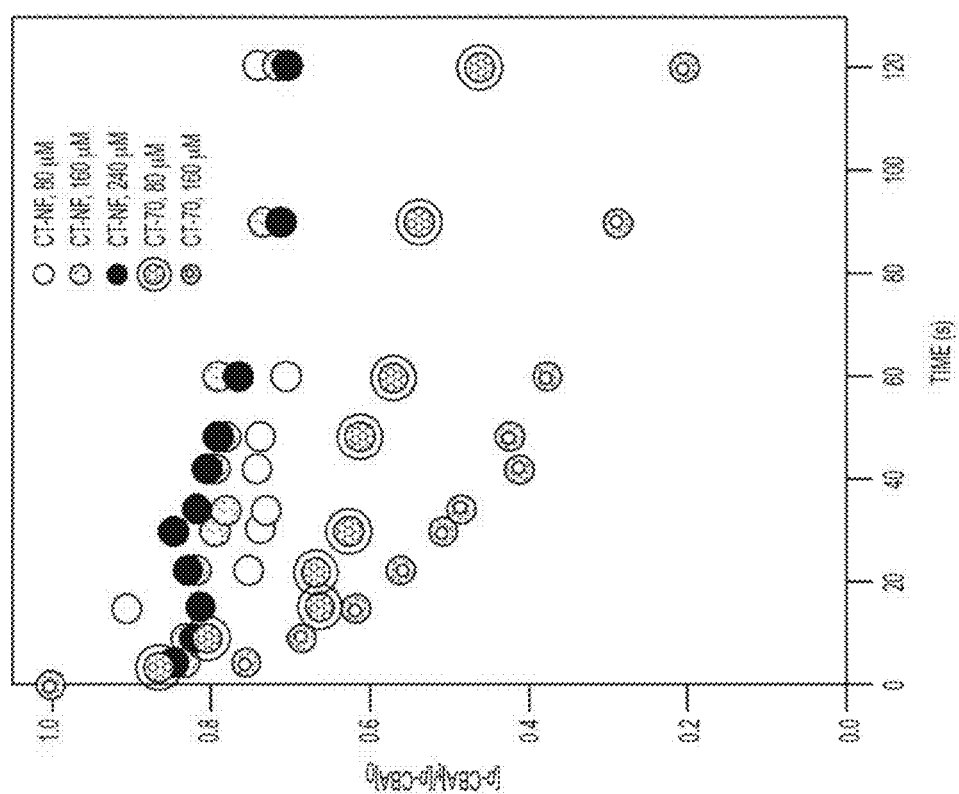

In FIG. 6, the abrupt but limited p-CBA decay in CT-NF suspensions implies that only a limited number of surface sites initially available on non-oxidized CNTs can to produce .OH. In a subset of follow-up experiments, we compared the influence of $O_3$ concentration on .OH formation in these CT-NF suspensions (FIG. 18), observing that p-CBA removal was, in fact, independent of initial $O_3$ (80-240 μM). Thus, the small amount of .OH formation in CT-NF systems is not limited by available $O_3$ but by other factors. In contrast, oxidized CT-70 systems exhibited the expected two-fold increase in p-CBA removal when initial $O_3$ concentration was doubled (FIG. 18), consistent with surface oxidation alleviating limitations in .OH formation.

Figures 7C, 7D:
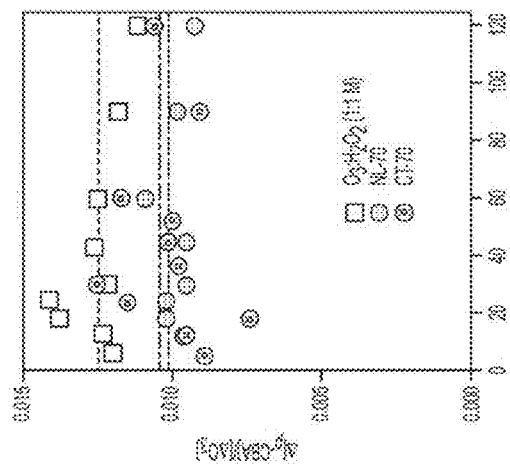
FIGS. 7$a$-$d$.
Figure 19:
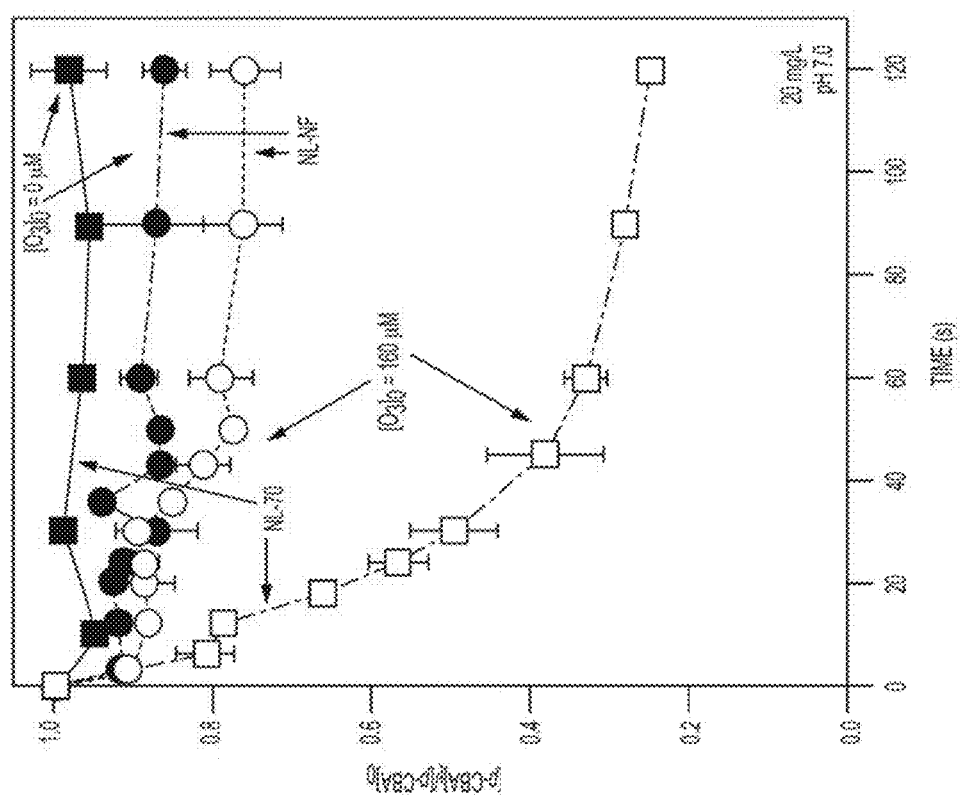
FIG. 19. Normalized p-CBA concentration as a function of time for NL-NF and NL-70 suspensions. For both suspensions, p-CBA data are shown for systems in the presence (open symbols, 160 μM) and absence (solid symbols) of $O_3$, and p-CBA concentration data collected in the presence of $O_3$ have not been corrected for sorption losses. Uncertainties represent standard deviations for at least triplicate experiments. As discussed in the main text, NL-NF suspensions showed only a minimal increase in p-CBA degradation relative to the system free of $O_3$. Such behavior is consistent with the majority of p-CBA loss in NL-NF suspensions resulting from sorption. Behavior of NL-70, on the other hand, was markedly different. Relative to NL-NF, not only was p-CBA degradation considerably increased in the presence of $O_3$, but the extent of p-CBA sorption in suspensions without $O_3$ also decreased. We contend that if the increased reactivity associated with MWCNT functionalization was purely a result of increased MWCNT dispersion, the fraction of p-CBA loss attributable to sorption in NL-70 systems would match the fraction of mass adsorbed with as-received NL-NF. It appears, therefore, that oxidation with $HNO_3$ changes the inherent nature of the NL MWCNT surface from that of a sorbent to a substrate capable of generating .OH during ozonation.

For more reactive oxidized MWCNTs, experimental evidence indicates that their improved dispersivity (which maximizes reactive surface area in suspension) cannot fully explain their superior .OH production. For example, we found the majority of p-CBA loss in NL-NF suspensions resulted from its sorption onto the hydrophobic MWCNT surface (i.e., removal in NL-NF systems was similar with or without $O_3$; FIG. 19). Behavior of NL-70, on the other hand, was entirely different; not only was p-CBA degradation increased in the presence of $O_3$ but the extent of p-CBA sorption in $O_3$-free NL-70 suspensions decreased (FIG. 19), as expected on the more polar, oxidized MWCNT surface. We contend that if the increased reactivity of NL-70 was purely a byproduct of improved CNT dispersion, the fraction of p-CBA loss via sorption would be identical in NL-NF and NL-70 systems. Instead, it appears that oxidation with $HNO_3$ changes the inherent nature of the NL MWCNT surface from that of a sorbent to a substrate capable of generating .OH during ozonation. These changes in surface reactivity may be the result of oxide sites produced on the CNT surface during the $HNO_3$ functionalization process. FIG. 7d shows $R_{CT}$ values as a function of surface oxygen concentration for NL- and CT-MWCNTs oxidized with 20, 40 and 70% $HNO_3$. A strong, linear correlation between .OH exposure and surface oxygen concentration is observed for NL MWCNTs, while a slightly weaker relationship exists for CT MWCNTs.

From the correlation in FIG. 7d, it is tempting to conclude that surface oxides resulting from $HNO_3$ treatment (e.g., carboxyl (—COOH), hydroxyl (—OH), and carbonyl (—C=O) groups) are the reactive sites responsible for $O_3$ decay and .OH formation. For example, in an earlier work with these same NL MWCNTs, identical treatment with 70% $HNO_3$ produced —COOH groups in the greatest abundant, comprising ~40% of the generated surface oxides (—OH and —C=O groups are formed to lesser extents). Although carboxylic acid groups are known to exhibit very little reactivity toward $O_3$, there are several indirect mechanisms by which such groups could promote .OH formation. Hoigne and Bader *Wat. Res.* 1983, 17, 185-194 found that deprotonated carboxylic acid groups, as is the case in our pH 7 suspensions, enhance the reactivity of $O_3$ toward adjacent aryl or alkene groups, as might be encountered in the sidewalls of oxidized MWCNT. Alternatively, Vecitis et al. found that carboxylates can be degraded through the radical chain process and subsequently convert $O_3$ to .OH. Others have suggested that during ozonation .OH is primarily scavenged by the carbon centers in MWCNT sidewalls, and that the rate of scavenging decreases as these carbon centers become occupied with surface oxides. Although this last scenario cannot be entirely discounted, the data herein do not support such a role for surface oxides in promoting .OH exposure. Specifically, values of [Δp-CBA]/[Δ$O_3$] did not change significantly with increasing surface oxygen concentration (e.g., values were equivalent for NL-40 and NL-70, and CT-40 and CT-70), whereas one would expect this ratio to increase if scavenging was more limited on oxidized surfaces. See Vecitis, C. D., et al., *J. Phys. Chem. A.* 2010, 144, 4968-4980; and Morales-Lara, F., et al., *J. Phys. Chem. C* 2013, 117, 11647-11655.

Ultimately, due to the complexity of the MWCNT surface, additional investigation is needed to clearly elucidate the origin of the correlation in FIG. 7*d*. Beyond surface oxides, oxidizing agents can also produce amorphous carbon debris on the MWCNT surface while also inducing surface defects, and the amount of these potentially reactive oxidation byproducts would also be expected to scale with surface oxygen concentration. Because amorphous carbon and surface defects are most prominent when using more aggressive oxidizing agents (e.g., $HNO_3$ in combination with $H_2SO_4$) than those explored herein, we do not anticipate their extensive involvement in .OH production in our experimental systems. See Fogden, S., et al., *Chem. Phys. Letts.* 2008, 460, 162-167; and Verdejo, R., et al., *Chem. Comm.* 2007, 513-515.

Practical Performance Considerations for MWCNT-based AOPs.

Figure 20:
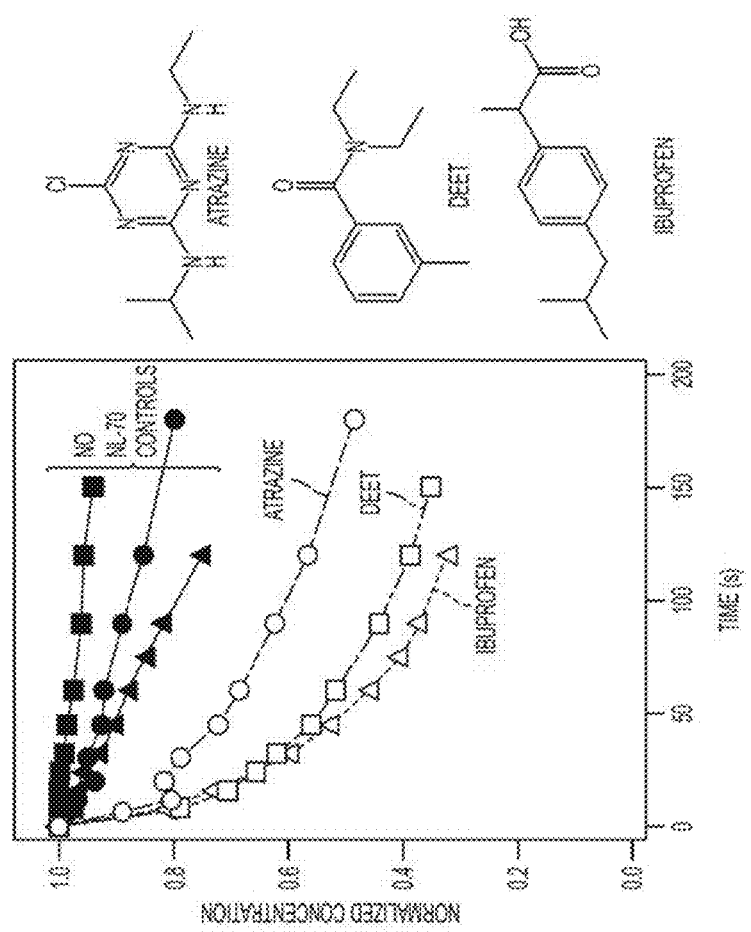
FIG. 20. Reactivity studies conducted with ozone-recalcitrant organic micropollutants atrazine (10 μM) (represented by circle), DEET (50 μM) (represented by square) and ibuprofen (50 μM) (represented by triangle). Open symbols are from ozonated suspensions of NL-70 (10 mg/L), while solid (black) symbols are control data from ozonated systems without NL-70. All data have been corrected for sorption, which was <5% of the total mass for all analytes on NL-70 in ozone-free controls over the timescales of these reactions. All experiments were at pH 7 and conducted in the presence of t-butanol (320 μM). In all instances, the presence of NL-70 enhances reactivity relative to CNT-free controls and trends in micropollutant reactivity scale with reported second-order rate coefficients for reaction with .OH (reported[16] $k_{OH}$ values: atrazine=3.17 (±0.18)×10$^9$; DEET 4.95 (±0.18)×10$^9$; ibuprofen 5.97 (±0.22)×10$^9$). Specifically, these second-order rate coefficients produce a relative reactivity trend toward .OH (1.0: 0.83:0.53 for ibuprofen:DEET:atrazine) that matches well with their relative reactivity in ozonated NL-70 suspensions. If it is assumed that all loss in ozonated NL-70 suspensions result via reaction with .OH and approximate the initial micropollutant loss (for time <30 sec) as following exponential decay, a relative trend for these initial $k_{obs}$ values of 1.0:0.88:0.44 for ibuprofen:DEET:atrazine is obtained. Alternatively, a similar relative reactivity trend in ozonated NL-70 suspensions (1.0:0.90:0.63) is obtained if the percent of micropollutant removal at 120 seconds is used as the basis of our reactivity comparison.

The practical viability of MWCNT ozonation was explored in a series of experiments more representative of treatment applications. For example, it was determined that reactivity of ozonated NL-70 suspensions could be extended to other $O_3$-recalcitrant organic micropollutants including atrazine, DEET, and ibuprofen (FIG. 20), with relative removal closely matching expectations from reported second-order rate coefficients for their reaction with .OH (Cooper, W. J., et al., 2010; pp 52, available at: https://-www.wateruse.org/files/s/docs/wrf-04-017.pdf.).

Figure 8C:
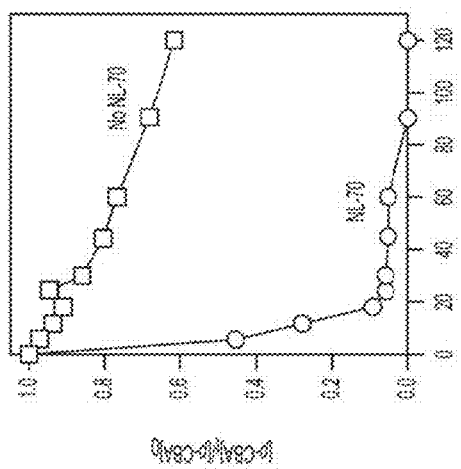
FIGS. 8$a$-$d$. Removal of p-CBA during ozonation of MWCNTs in the presence of FIG. 8($a$) carbonate and FIG. 8($b$) SRHA, as well as in FIG. 8($c$) partially treated Iowa River water and FIG. 8($d$) as a function of exposure to concentrated $O_3$ solutions. Studies with carbonate were conducted at 0.1 (triangles), 1 (circles), and 5 (square) mM (5, 50 and 250 mg/L as $CaCO_3$), while SRHA experiments we conducted at 0.5 (triangles) and 5 (squares) mg/L. In panels (a) and (b), solid black circles indicate p-CBA removal in a model phosphate buffer (PB) system. In panel (c), results are shown for ozonated systems with and without NL-70, as indicated, and experiments were conducted in the absence of t-butanol. Panel (d) shows results with NL-NF and NL-70, both before (t=0) and after 12 h of exposure to concentrated $O_3$ (t=12 h). Unless otherwise noted, experimental conditions: MWCNT=10 mg/L; $[O_3]$=160 μM; [t-butanol]=320 μM; [p-CBA]=2 μM; pH 7 (5 mM phosphate buffer).

Using p-CBA, .OH formation in more complex aquatic matrices was also examined. It was determined that p-CBA decay in ozonated NL-70 suspensions was not affected by carbonate, a known radical scavenger, up to 250 mg/L as $CaCO_3$ at pH 7 (FIG. 8*a*). To allow direct comparison to results from model (phosphate buffer) systems, these NL-70 suspensions not only contained carbonate but also the model scavenger t-butanol (320 µM). Thus, the levels of carbonates employed, representative of natural systems, were not sufficient to further inhibit NL-70 reactivity beyond the radical scavenging already afforded by t-butanol in our systems. Others have attributed the limited impact of carbonate in $O_3$/GAC systems to the ability of GAC surface groups to neutralize $HCO_3^-$ ions, and a similar mechanism could also be at play in NL-70 suspensions. See Sanchez-Polo, M., et al., *Ozone-Sci. Eng.* 2006, 28, 237-245.

Reactivity was also maintained in the presence of up to 5 mg/L of SRHA (FIG. 8*b*), which we used as a surrogate for natural organic matter. Once again, all systems in FIG. 8*b* not only contained SRHA but also the model scavenger t-butanol (320 µM) to facilitate comparison to model system results. It is well known that SRHA is highly reactive toward $O_3$ and promotes its decomposition. In fact, as shown in FIG. 8*b*, systems containing only SRHA (0.5 or 5 mg/L without NL-70) produced p-CBA loss upon ozonation. Nevertheless, the greatest p-CBA removal occurred in NL-70 suspensions, whose reactivity was quite comparable across the range of SRHA concentrations explored. Notably, the extent of p-CBA removal in the mixture of NL-70 and 5 mg/L SRHA was less than the sum of p-CBA removal measured when NL-70 and 5 mg/L SRHA suspensions were reacted with $O_3$ in isolation. The lower than expected mixture reactivity may be evidence that such high levels of SRHA more efficiently scavenge .OH, as was observed with high concentrations of t-butanol (FIG. 10), and/or block reactive sites on the NL-70 surface so as to diminish reactivity relative to SRHA-free systems.

Unlike work with carbonate and SRHA, studies using highly alkaline (~200 mg/L as $CaCO_3$) and hard (275 mg/L as $CaCO_3$) sedimentation basin effluent from the UIWTP were conducted without added t-butanol to simulate water treatment conditions. In these partially treated source water samples, .OH scavenging by the matrix was insufficient to suppress p-CBA decay during NL-70 ozonation, a result also obtained with atrazine. In fact, the rate of p-CBA loss in these natural water samples was greater than those measured in model phosphate buffer systems, suggesting that the level of scavenging from t-butanol in our model systems likely exceeds some natural waters. In partially treated Iowa River water, we did observe modest p-CBA decay in the absence of NL-70, suggesting that the dissolved organic matter (DOM) in the UIWTP sample promotes .OH formation, as we observed with SRHA and has been reported for other forms of DOM. Nevertheless, these results validate our findings with model scavengers (carbonate and SRHA), and suggest this technology may even be applicable to source waters with only modest pretreatment (coagulation, flocculation, sedimentation), although the long-term performance implications of such water quality (e.g., fouling of the MWCNT surface over time) must be more rigorously considered.

Figure 8D:
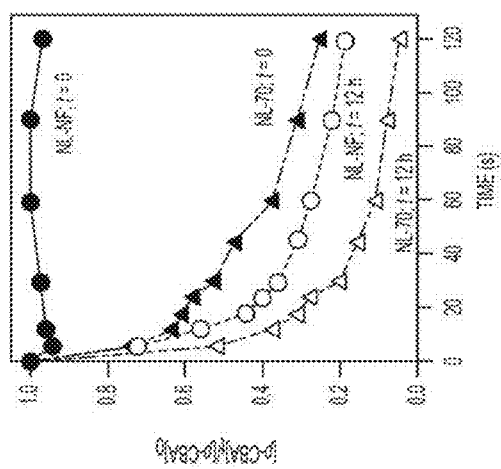

Lastly, FIG. 8*d* considers the reactivity of NL-NF and NL-70 suspensions (150 mL total volume, 0.5 g/L) after extended ozonation. After 12 h of continuous exposure to a concentrated (~20 mg/L) ozone solution, NL-70 suspensions maintain their ability to generate .OH (i.e., degrade p-CBA). Interestingly, NL-NF suspensions, which initially did not promote p-CBA decomposition, became more reactive over time and after 12 h of aging matched the reactivity of NL-70 suspensions. This ripening behavior for NL-NF suspensions was expected, as $O_3$ is a recognized oxidizing agent for CNTs, and surface oxygen on the 12 h aged NL-NF had increased to ~10% by XPS analysis (comparable to NL-70). Accordingly, sustained reaction with $O_3$ helps to create, and perhaps even regenerate, the as yet unidentified surface sites responsible for .OH formation. Further, characterization of these aged MWCNTs (FIG. 21) revealed no obvious signs of wear from extended ozonation. However, because oxidation must consume carbon, more extensive aging studies over longer timescales and using more representative reactor designs and treatment conditions (i.e., lower ozone doses) are needed to definitely quantify exhaustion. From persistent reactivity after 12 h of exposure to 20 mg/L of $O_3$, only about 3 g of MWCNTs per mg/L ozone would be needed annually for sustained .OH production. See Buffle, M.-O., et al., *Wat. Res.* 2006, 40, 1884-1894; Buffle, M.-O., et al., *Ozone-Sci. Eng.* 2006, 28, 247-259; Naeimi, H., et al., *Appl. Surf. Sci.* 2009, 256, 631-635; Peng, K., et al., *Carbon* 49, 70-76; Banerjee, S., et al., *Chemistry—A European Journal* 2003, 9, 1898-1908; Banerjee, S., et al., *J. Phys. Chem. B.* 2002, 106, 12144-12151; Hernadi, K, et al., *Reactivity of different kinds of carbon during oxidative purification of catalytically prepared carbon nanotubes,* 14th International Symposium on the Reactivity of Solids, Aug. 27, 2000-Aug. 31, 2000, Budapest, Hungary, 2001; Elsevier: Budapest, Hungary, 2001; pp 2003-209; Simmons, J. M., et al., *J. Phys. Chem. B* 2006, 110, 7113-7118; and Vennerberg, D. C., et al., *ACS Appl. Mater. Interf.* 2014, 6, 1835-1842.

Demonstration of Hybrid CNT-Ceramic Filter for Flow-Through Treatment.

Figure 9C:
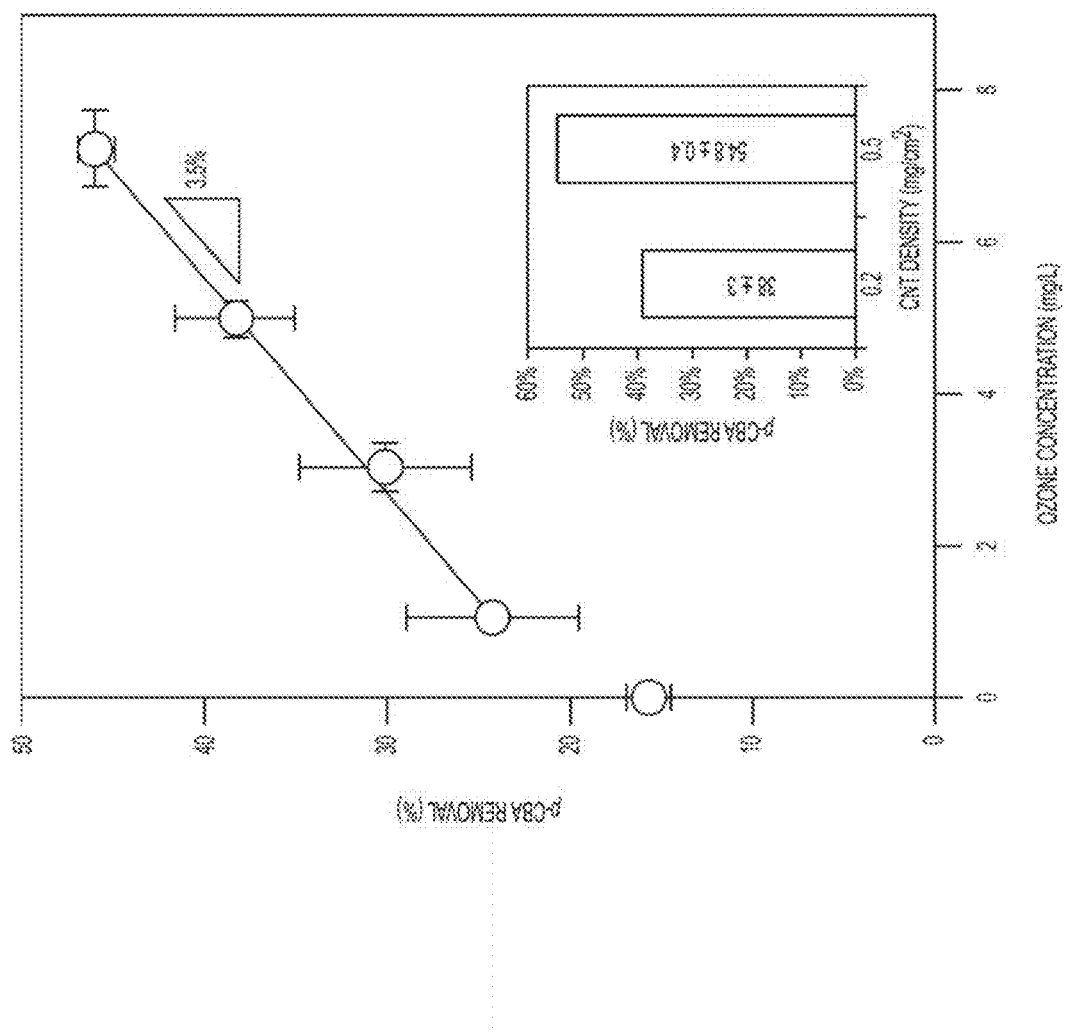
FIGS. 9$a$-$c$.

Because mobilization risks will likely render CNTs untenable as a treatment technology when used in suspensions, a more attractive option is the deployment of CNTs as a reactive layer deposited on an $O_3$-resistant (i.e., ceramic)

membrane support that will help to control CNT release. This concept, which is evocative of ceramic membrane modification with metal oxide nanoparticles for use during ozonation, is demonstrated in FIG. 9a, showing cross-sectional and top-down SEM images of a 0.2 μm anodic aluminum oxide (AAO) filter disk coated with NL-70. Suspension vacuum deposition, analogous to approaches used elsewhere, created a relatively uniform, thin (<1 μm) NL-70 layer on the membrane surface, while also allowing the NL-70 mass (or areal density) in the coating to be easily tailored. See Karnik, B. S., et al., *Environ. Sci. Technol.* 2005, 39, 7656-7661; Brady-Estevez, A. S., et al., *Small* 2008, 4, 481-484; and Brady-Estevez, A. S., et al., *Langmuir* 2010, 26, 19153-1915.

Using a simple bench-top set-up as a proof-of-concept, it was determined that the reactivity of NL-70 demonstrated in batch systems can be extended to more dynamic flow conditions representative of water treatment. Using a standard vacuum pump this set-up achieved fluxes on the order of 500 L/m$^2$-h, within the range for microfiltration. Despite the very short contact time in the thin MWCNT layer (which we estimate is on the order of several milliseconds, at most; see SI), not only p-CBA removal was observed, but clear trends in design variables that can be used to optimize this hybrid filter's performance were identified. First, due to the high solid-to-water ratio within a 0.2 mg/cm$^2$ MWCNT layer, some (~15%) p-CBA loss observed in the absence of ozone must be attributable to adsorption. However, increasing influent $O_3$ concentrations from 1 to 8 mg/L produced a corresponding linear increase in p-CBA removal during a single filtration event via reaction with .OH, ultimately achieving a maximum removal of 50%. Second, p-CBA removal in a single filtration event could also be enhanced by increasing the mass NL-70 deposited on the filter from 0.2 to 0.5 mg/cm$^2$.

Environmental Implications.

MWCNTs effectively promote formation of .OH during ozonation, and their degree of surface oxidation positively influences this process. Thus, while further investigation is necessary to elucidate the fundamental surface chemical mechanisms at play, CNT surface oxygen content should be viewed as a practical metric for optimizing MWCNT performance. It has been shown that highly oxidized MWCNTs (i.e., ~10% surface oxygen from XPS) exhibit reactivity on par to some traditional AOPs (e.g., $O_3/H_2O_2$), and that this reactivity is sustained across diverse solution chemistries representative of water treatment, extended exposure to $O_3$, and toward a suite of $O_3$-recalcitrant organic micropollutants.

It has also been demonstrated in a bench-top filtration set-up (FIG. 9) that high reactivity affords effective degradation of pollutants even at very short contact times that will be encountered in a flow through system. Further, relative to other reagents (e.g., $H_2O_2$) that are completely consumed upon dosing, the material properties of CNTs allow for their application over extended time periods, with the potential that only relatively small MWCNT masses may be needed for sustained activity (see FIG. 8d). Thus, even if the role of CNTs is not truly catalytic (i.e., CNTs are degraded to some degree via extensive oxidation), their sustained reactivity during ozonation may make them a cost-competitive approach relative to more traditional reagents such as $H_2O_2$. See Brady-Estevez, A. S., et al., *Small* 2008, 4, 481-484; Brady-Estevez, A. S., et al., *Langmuir* 2010, 26, 19153-19158; Mauter, M. S., et al., *Environ. Sci. Technol.* 2008, 42, 5843-5859; Gao, G., et al., *Environ. Sci. Technol.* 2011, 45, 9726-9734; and Rahaman, M. S., et al., *Environ. Sci. Technol.* 2012, 46, 1556-1564.

Supplemental Materials and Methods

Oxidation of MWCNTs with $HNO_3$.

MWCNTs were acquired from CheapTubes.com (www.cheaptubes.com; Brattleboro, Vt.) and Nanolabs, Inc (www.nano-lab.com; Waltham, Mass.). Both had vendor-specified purities >95% and were synthesized via chemical vapor deposition. Functionalization followed established protocols with concentrated nitric acid ($HNO_3$). This consisted of sonicating MWCNTs in an $HNO_3$ solution (20, 40, or 70% $HNO_3$) for one hour, then refluxing the MWCNT/$HNO_3$ mixture in an oil bath at 140° C. for 1.5 h. After cooling overnight, the MWCNTs were captured on a 0.2 μm nitrocellulose filter. They were cleaned via repeated washing with DI water using a vacuum filter until the rinse water read a pH value greater than 5. Recovered MWCNTs were then dried overnight at 100° C. and pulverized with a ball mill to form a powder.

Preparation and Handling of MWCNT Suspensions.

Concentrated (1 g/L) stock suspensions of all MWCNTs were prepared in DI water. To promote dispersion, these suspensions were then subjected to extended (20 h) sonication (Bransonic Ultrasonics Corporation, 42 kHz±6%). Immediately prior to use in reactivity studies, MWCNT stock solutions were once again sonicated for at least 15 min, with experimentation revealing that longer sonication times had no effect on suspension reactivity. All stock suspensions were used within 30 min of sonication, after which we observed slight losses in suspension reactivity, presumably due to reaggregation.

Production of $O_3$ Stock Solutions.

Solutions of $O_3$ were produced using a DelOzone LG-14 ozone generator with a high purity (99%) $O_2$ feed. The $O_3/O_2$ gas mixture discharged from the generator was bubbled through a glass dispersion tube into 125 ml of a 5 mM phosphate buffer in an ice bath to create a concentrated $O_3$ stock solution. Tests showed that a steady-state dissolved $O_3$ concentration was achieved after roughly five minutes of bubbling Ozone stock solutions typically had an initial concentration of ~20 mg/L, which is near the solubility limit for $O_3$ at 3° C. when using a feed gas ozone concentration of ~2-3 wt %. See Smith, B., et al., *Langmuir* 2009, 25, 9767-9776; Metcalf & Eddy. *Wastewater Engineering: Treatment and Reuse.* 4th ed.; San Francisco, 2003; and Ozone Solutions: Ozone Water Treatment. Available at http://www.ozonesolutions.com-/info/ozone-water-treatment.

Preparation and Handling of Ozone Solutions.

All solutions and glassware used herein were first pre-treated with $O_3$ or $O_3$ stock solution, respectively, to remove any $O_3$-active compounds, best practices recommended by others to increase the reproducibility in experimental systems (Bader, H.; Hoigne, J., *Wat. Res.* 1981, 15, 449-456).

Use of t-Butanol as a Model Radical Scavenger.

t-Butanol (320 μM) was included in nearly all reactivity studies. Its inclusion helps to ensure that the .OH results primarily from $O_3$ reaction on the MWCNT surface because as a radical scavenger it helps to quench a catalytic cycle initiated by .OH that yields superoxide anion radical ($O_2$.$^-$), and ultimately, more .OH. Most reactors, therefore, contained 320 μM of t-butanol as a model radical scavenger, a value that was chosen based upon values previously reported in $O_3$/GAC studies. As described in the main text, inclusion of t-butanol was necessary, as experiments conducted in its absence proceeded too quickly to observe p-CBA decay [i.e., all p-CBA was consumed by our first sampling point (<10 sec)]. Alternatively, much higher concentrations (1.6 mM or ~120 mg/L) almost entirely suppressed p-CBA decay (i.e., .OH formation). Ultimately, 320 µM was used consistently across all reactors to match the t-butanol concentration used in earlier $O_3$/GAC studies. Further, this value was sufficient to entirely inhibit p-CBA decay in $O_3$-only systems (i.e., in MWCNT-free controls) over the timescales of reaction in $O_3$-containing MWCNT suspensions. Accordingly, any increase in p-CBA decay observed in the presence of MWCNTs could reasonably be attributed their ability to promote .OH formation. Also, given that the same concentration was used in all studies, trends in MWCNT reactivity can also reasonably be interpreted based on their relative ability to generate .OH during ozonation. See Beltran, F. J., et al., *Ind. Eng. Chem. Res.* 2002, 41, 6510-6517; Faria, P. C. C., et al., *Appl. Catal. B-Environ.* 2008, 79, 237-243; Sanchez-Polo, M., *Carbon* 2003, 41, 303-307; Sanchez-Polo, M., et al., *Wat. Res.* 2008, 42, 4163-4171; Sanchez-Polo, M.; Rivera-Utrilla, J.; von Gunten, U. Metal-doped carbon aerogels as catalysts during ozonation processes in aqueous solutions. *Wat. Res.* 2006, 40, 3375-3384; Sanchez-Polo, M, et al., *Ozone-Sci. Eng.* 2006, 28, 237-245; Sanchez-Polo, M., et al., *Wat. Res.* 2005, 39, 3189-3198; Staehelin, J.; Hoigne, J. *Environ. Sci. Technol.* 1985, 19, 1206-1213; and Jans, U.; Hoigne, *J. Ozone-Sci. Eng.* 1998, 20, 67-90.

Control Studies.

Control studies included experiments with p-CBA (or other organic targets) conducted with $O_3$ in the absence of CNTs to assess their inherent reactivity toward ozone. Additional controls explored the stability of p-CBA (or other organic targets) in CNT suspensions without $O_3$ to assess sorption. Sorption on CNTs was generally minimal, but it did occur to a greater extent on non-oxidized CNTs relative to more polar, oxidized CNTs. When sorption was observed, reactivity data collected in ozonated CNT suspensions were corrected to account for sorption losses (unless otherwise indicated). A final set of control experiments examined .OH production during ozonation of the supernatant of the CNT suspensions, which was collected via centrifugation. This test was performed to determine if it was the CNT surfaces that were reactive or some dissolved component of the CNT solutions. The test showed that p-CBA loss was insignificant in the supernatant system compared to the ozone-only system, supporting the theory that .OH production is mediated by the CNTs surface and not due to soluble components leached from CNTs that may promote .OH formation in bulk solution.

Detailed Description of Performance Validation Studies.

Comparison to Conventional Ozone-Based AOPs. A parallel set of reactivity experiments was performed with GAC (Calgon; Pittsburgh, Pa.) that was synthesized (via a proprietary process) specifically for catalytic ozonation applications. .OH production via $O_3$ with $H_2O_2$ was also explored. Experiments with GAC were performed as described in the main text for MWCNTs with typical GAC concentrations ≥40 mg/L (the smallest loading at which .OH production was observable). Experiments with $O_3/H_2O_2$ generally followed the procedures outlined in the main text for CNT systems. To initiate reaction, however, a volume of 10 mM $H_2O_2$ (Sigma, 30% W/W) in DI water was added to the reactor to achieve in an initial $H_2O_2/O_3$ molar ratio of 1:1, a ratio previously used for comparison to catalytic ozonation with GAC (Sanchez-Polo, M., et al., *Ozone-Sci. Eng.* 2006, 28, 237-245).

Reactivity toward $O_3$-Recalcitrant Organic Micropollutants.

Additional experiments explored removal of atrazine (Fluka; 99.1%), ibuprofen (Sigma Aldrich; 98.0), and DEET (Fluka; 97.6%), which are all slowly degraded by ozone. These experiments were conducted following protocols outlined for p-CBA in the main text (e.g., 10 mg/L of NL-70) but at an initial target concentration of 10 µM. Controls were also conducted with $O_3$ in the absence of MWCNTs and with MWCNTs in the absence of ozone for each species.

Influence of Water Quality on MWCNT Reactivity.

Reactivity studies with p-CBA were also conducted in the presence of known radical scavengers carbonate (added as sodium bicarbonate at concentrations of 0.1, 1 and 5 mM, which equates up to 250 mg/L as $CaCO_3$) and humic acid (1 and 5 mg/L of Suwanee River Humic Acid or SRHA), in which MWCNTs were first equilibrated overnight with these solutions prior to reactivity studies. These studies were conducted in the presence of 320 µM of t-butanol to facilitate direct comparison to results with p-CBA obtained in model phosphate buffer systems. Studies of possible aquatic matrix effects also explored p-CBA and atrazine removal from partially treated Iowa River water obtained from the effluent of the sedimentation basin at the University of Iowa Water Treatment Plant (UIWTP). This water was characterized by the UIWTP as follows: pH 7.2; turbidity 1-1.5 NTU; alkalinity 170-200 mg/L and total hardness of 275 mg/L (as determined by standard methods at the UIWTP). Ozonation experiments with sedimentation basin effluent were conducted with and without the addition of t-butanol.

Reactive Longevity after Extended $O_3$ Exposure.

Performance lifetime studies used NL-NF and NL-70 suspensions previously exposed to concentrated $O_3$ solution. MWCNT aging involved dispersing the ozone generator output, which was typically able to produce a steady-state output concentration of 20 mg/L in the absence of CNTs, directly into 0.5 g/L MWCNT suspensions (total volume 150 mL). Aging was conducted up to 12 hours, during which DI water was added as needed to offset evaporative losses. Periodically, samples of suspension were withdrawn, allowed to sit overnight to remove any residual $O_3$, and then utilized in reactivity studies with p-CBA.

Details of HPLC Methods.

The analytical method for p-CBA analysis used an isocratic 60:40 methanol:water eluent adjusted to pH 2.7 with $H_3PO_4$. The Agilent 1100 HPLC/DAD used an Eclipse XBD-C18 column (4.6×150 mm, 5 µm particle size) and a 100 µL injection volume and a 1 mL/min flow rate. See Rosenfeldt, E. J., et al., *Wat. Res.* 2006, 40, 3695-3704.

Details of Ozone Measurement with Indigo Trisulfonate.

The colorimetric reagent solution was made by combining 77 mg of potassium indigo trisulfonate, 1 mL of 2 M phosphoric acid, and 99 mL of deionized water. This solution was further diluted to an appropriate concentration for use in colorimetric analysis of the ozone levels used in our experiments. Specifically, this dilution involved combining 20 mL of the indigo trisulfonate solution with 10 mL of 2M phosphoric acid and 370 mL of deionized water prior to use in analysis. This diluted mixture was then placed into 1.5 mL plastic microcentrifuge tubes at a volume of 1 mL Experimental samples of 200 µL were then added to this microcentrifuge tube, shaken by hand, and then transferred to a 1 mL cuvettes for colorimetric analysis at 600 nm. Decreases in the blue color of the solution were indicative of ozone reaction with the indigo reagent, such that lower absorbances corresponded to higher ozone concentrations. Independent tests verified that the presence of CNTs did not affect colorimetric analysis of $O_3$ with indigo trisulfonate in reactor samples.

MWCNT Characterization.

TEM images were collected on a high resolution JEOL 2100F transmission electron microscope in bright field mode operating at 200 kV. Samples were prepared for TEM analysis through the addition of a drop of dilute MWCNT suspension prepared in DI water onto a holey carbon Cu TEM grid.

XPS surface characterization was performed in a custom-designed Kratos Axis Ultra X-ray photoelectron spectroscopy system was used. As described previously, the surface analysis chamber is equipped with monochromatic radiation at 1486.6 eV from an aluminum Kα source using a 500 mm Rowland circle silicon single crystal monochromator. Survey scans were collected using the following instrument parameters: energy scan range of 1200 to −5 eV; pass energy of 160 eV; step size of 1 eV; dwell time of 200 ms and an X-ray spot size of 700×300 μm. High resolution spectra were acquired in one sweep of all regions of interest using the following experimental parameters: 20 to 40 eV energy window; pass energy of 20 eV; step size of 0.1 eV and dwell time of 1000 ms. All spectra were calibrated using C1s peak at 285.0 eV. A Shirley-type background was subtracted from each spectrum to account for inelastically scattered electrons that contribute to the broad background. CasaXPS software was used to process the XPS data. Transmission corrected relative sensitivity factor (RSF) values from the Kratos library were used for elemental quantification. See Baltrusaitis, J., et al., *Phys. Chem. Chem. Phys.* 2007, 9, 3011-3024; and Cooper, W. J., et al., *Reaction rates and mechanisms of advanced oxidation processes for water resue*; WateReuse Foundation Report; 2010; pp 52, available at: https://www.watereuse.org/-files/s/docs/wrf-04-017.pdf.

Specific surface areas were measured using a Quantachrome BET Nova 4200e automated surface area analyzer. Samples were outgassed overnight at 100° C. under vacuum prior to analysis via a seven point $N_2$ BET adsorption isotherm.

Solution-phase characterization was performed on 20 mg/L suspensions of various MWCNTs prepared in a 5 mM phosphate buffer as described in the main text. Dynamic light scattering (DLS) and zeta potential analyses were conducted with a ZetaPals analyzer (Brookhaven Instruments Corporation, Holtsville, N.Y.). Mean hydrodynamic particle diameters via DLS were measured at pH 7, whereas zeta potential analysis was conducted as a function of pH. Suspensions were adjusted to their desired pH value (pH 2, 5, 7 and 9) prior to analysis using dilute NaOH or HCl to adjust the pH to the desired value. Measurements were repeated five times for quality control. The stability of CNT suspensions at pH 7 as a function of surface oxidation was also examined using sedimentation tests. Suspensions (20 mg/L) were prepared in 5 mM phosphate buffer. A portion of suspension was then transferred to a 1-cm quartz cuvette and rates of settling were measured by the change in light transmittance (λ of 300 nm) as a function of time using a UV/visible spectrophotometer (Thermo Fisher Scientific, Genesys 10S).

Table 5 shows the hydrodynamic diameter as measured by DLS for as-received and oxidized MWCNT.

TABLE 5

Measurements were conducted at pH 7 on 20 mg/L suspensions of MWCNTs prepared as described above.

| MWCNT | Mean Hydrodynamic Diameter (nm) |
|---|---|
| NL-NF | 3.4 (±0.8) × $10^4$ |
| NL-70 | 330 (±20) |
| CT-NF | 4.3 (±0.5) × $10^4$ |
| CT-70 | 320 (±9) |

All publications, patents, and patent documents cited or discussed herein are incorporated by reference herein in their entirety, as though individually incorporated by reference. The invention has been described with reference to various specific and preferred embodiments and techniques. However, it should be understood that many variations and modifications may be made while remaining within the spirit and scope of the invention.

What is claimed is:

1. A filtration method comprising:
passing a first fluid including one or more substances to be filtered through carbon nanotubes that function as an ozonation catalyst and generate hydroxyl radicals, wherein the carbon nanotubes are carboxylated and hydroxylated, to form a second fluid lacking at least one of the one or more substances to be filtered.

2. A purification method comprising:
passing a fluid including one or more contaminants and ozone through carbon nanotubes that function as an ozonation catalyst and generate hydroxyl radicals, wherein the carbon nanotubes are carboxylated and hydroxylated, to form a purified fluid lacking at least a portion of the one or more contaminants.

* * * * *